US010683426B2

(12) United States Patent
Berger et al.

(10) Patent No.: US 10,683,426 B2
(45) Date of Patent: Jun. 16, 2020

(54) POLYURETHANES, DISPERSIONS THEREOF, THEIR PREPARATION AND USE

(71) Applicant: BASF SE, Ludwigshafen (DE)

(72) Inventors: Sebastian Berger, Ann Arbor, MI (US); Juergen Kaczun, Wachenheim (DE); Peter Thuery, Ludwigshafen (DE); Markus Hickl, Mannheim (DE); Steven Zijlstra, Na Zwolle (NL); Martin Kaarup Bek, Sint Nicolaasga (NL); K. Shaun Tranter, Wachenheim (DE)

(73) Assignee: BASF SE, Ludwigshafen (DE)

( * ) Notice: Subject to any disclaimer, the term of this patent is extended or adjusted under 35 U.S.C. 154(b) by 808 days.

(21) Appl. No.: 14/440,440

(22) PCT Filed: Nov. 12, 2013

(86) PCT No.: PCT/EP2013/073609
§ 371 (c)(1),
(2) Date: May 4, 2015

(87) PCT Pub. No.: WO2014/076073
PCT Pub. Date: May 22, 2014

(65) Prior Publication Data
US 2015/0247043 A1    Sep. 3, 2015

Related U.S. Application Data

(60) Provisional application No. 61/727,136, filed on Nov. 16, 2012.

(30) Foreign Application Priority Data

Nov. 16, 2012    (EP) .................................... 12193043

(51) Int. Cl.
C08G 18/44     (2006.01)
C09D 175/14    (2006.01)
C09D 11/102    (2014.01)
C08G 18/66     (2006.01)
C08G 18/22     (2006.01)
C08G 18/73     (2006.01)
C08K 3/013     (2018.01)
C08G 18/32     (2006.01)
C08G 18/34     (2006.01)
C08G 18/72     (2006.01)
C08G 18/12     (2006.01)
C08G 18/78     (2006.01)
C08G 18/08     (2006.01)
C08G 18/67     (2006.01)
C08G 18/81     (2006.01)
B05D 1/02      (2006.01)
B05D 1/28      (2006.01)
B05D 3/06      (2006.01)
C09D 11/101    (2014.01)

(52) U.S. Cl.
CPC .............. $C09D\ 11/102$ (2013.01); $B05D\ 1/02$ (2013.01); $B05D\ 1/28$ (2013.01); $B05D\ 3/068$ (2013.01); $C08G\ 18/0823$ (2013.01); $C08G\ 18/12$ (2013.01); $C08G\ 18/227$ (2013.01); $C08G\ 18/3206$ (2013.01); $C08G\ 18/348$ (2013.01); $C08G\ 18/44$ (2013.01); $C08G\ 18/6625$ (2013.01); $C08G\ 18/673$ (2013.01); $C08G\ 18/6795$ (2013.01); $C08G\ 18/725$ (2013.01); $C08G\ 18/73$ (2013.01); $C08G\ 18/7837$ (2013.01); $C08G\ 18/81$ (2013.01); $C08K\ 3/013$ (2018.01); $C09D\ 11/101$ (2013.01); $C09D\ 175/14$ (2013.01)

(58) Field of Classification Search
CPC .. C08G 18/44; C08G 18/6795; C08G 18/673; C08G 18/725; C08G 18/7837; C08G 18/81; C09D 175/14
See application file for complete search history.

(56) References Cited

U.S. PATENT DOCUMENTS

| 5,623,001 A | 4/1997 | Figov | |
|---|---|---|---|
| 6,617,413 B1 * | 9/2003 | Bruchmann | ............. A61K 6/09 528/75 |
| 2007/0083002 A1 * | 4/2007 | Schafheutle | ....... C08G 18/0804 524/589 |
| 2010/0075115 A1 | 3/2010 | Tuerk et al. | |
| 2011/0143055 A1 * | 6/2011 | Tuerk | ................. C08G 18/6659 427/596 |

(Continued)

FOREIGN PATENT DOCUMENTS

DE    196 18 720 A1    11/1996
DE    198 26 712 A1    12/1999
(Continued)

OTHER PUBLICATIONS

JP-201204664_Mar. 2012_English Translation.*
(Continued)

Primary Examiner — Michael L Leonard
(74) Attorney, Agent, or Firm — Oblon, McClelland, Maier & Neustadt, L.L.P.

(57) ABSTRACT

The present invention relates to polyurethanes (A) being obtainable by reaction of (a) 15% to 70% by weight of di- or polyisocyanate comprising on average from 1 to 10 allophanate groups and on average from 1 to 10 C—C double bonds per molecule, and optionally (b) 0% to 60% by weight of further di- or polyisocyanate, with (c) 5% to 50% by weight of compounds having at least two isocyanate-reactive groups, comprising at least one polycarbonate diol with a molecular weight from 500 to 3000 g/mol weight % ages being based on total polyurethane (A), with the proviso that the total is 100%.

18 Claims, No Drawings

(56) References Cited

U.S. PATENT DOCUMENTS

| | | | | |
|---|---|---|---|---|
| 2011/0313101 | A1* | 12/2011 | Morikami | C08G 18/0823 524/591 |
| 2012/0164400 | A1 | 6/2012 | Nagahama | |
| 2013/0323426 | A1* | 12/2013 | Kaczun | C09D 11/101 427/287 |

FOREIGN PATENT DOCUMENTS

| | | |
|---|---|---|
| DE | 199 13 353 A1 | 9/2000 |
| EP | 0 007 508 A2 | 2/1980 |
| EP | 0 057 474 A2 | 8/1982 |
| EP | 0 495 751 A1 | 7/1992 |
| EP | 0 615 980 A2 | 9/1994 |
| EP | 0993 495 A1 | 4/2000 |
| EP | 2 452 988 A1 | 5/2012 |
| JP | 2007-161742 A | 6/2007 |
| JP | 2012-46664 | 3/2012 |
| JP | 2012046664 A * | 3/2012 |
| RU | 2 275 403 C2 | 4/2006 |
| WO | WO 98/33761 A1 | 8/1998 |
| WO | WO 99/01517 A1 | 1/1999 |
| WO | WO 03/070464 A1 | 8/2003 |
| WO | WO 2006/089933 A1 | 8/2006 |
| WO | WO 2008/098972 A1 | 8/2008 |
| WO | WO 2010/018074 A1 | 2/2010 |

OTHER PUBLICATIONS

International Search Report dated Dec. 4, 2013 in PCT/EP2013/073609.

International Preliminary Report on Patentability and Written Opinion dated May 19, 2015 in PCT/EP2013/073609.

English translation only of Japanese Office Action issued in corresponding JP Patent Application No. 2015-542242, dated Oct. 11, 2017.

* cited by examiner

POLYURETHANES, DISPERSIONS THEREOF, THEIR PREPARATION AND USE

This application is a National Stage of PCT/EP2013/073609, which was filed on Nov. 12, 2013. This application is based upon and claims the benefit of priority to U.S. Provisional Application No. 61/727,136, which was filed on Nov. 16, 2012, and to European Application No. 12193043.2, which was filed on Nov. 16, 2012.

The present invention relates polyurethane (A) being obtainable by reaction of
(a) 15% to 70% by weight of di- or polyisocyanate comprising on average from 1 to 10 allophanate groups and on average from 1 to 10 C—C double bonds per molecule, and optionally
(b) 0% to 60% by weight of further di- or polyisocyanate, with
(c) 5% to 50% by weight of compounds having at least one isocyanate-reactive group, comprising at least one polycarbonate diol with a molecular weight from 500 to 3000 g/mol.
weight % ages being based on total polyurethane (A), with the proviso that the total is 100%.

The present invention further relates to aqueous dispersions comprising a pigment (B), a polyurethane (A) and further comprising at least one polymerization inhibitor (C).

Similar dispersions comprising polyesters as compound (c) and their use for ink jet and printing ink applications are known from international application WO 2008/098972 and WO 2010/018074 A1.

The polyurethanes disclosed therein yield good printing results, however, a higher water resistance, chemical resistance and mechanical resistance, gloss, adhesion to plastic films and heat-seal resistance, especially for packaging printing applications is required.

It is frequently necessary to disperse pigments in a liquid and, in particular, aqueous medium in order that they may be further processed to form, for example, recording fluids and, in particular, liquid printing inks. Printing inks have to be stable in storage and demonstrate a homogeneous dispersion of the pigments in the ink. In addition, the prints obtained have to meet colorists' requirements, i.e., exhibit gloss, brilliance and depth of shade, and have good fastnesses, for example dry rub fastness, adhesion to printed substrate, light fastness, and especially water fastness and wet rub fastness when used for printing packaging material, particularly on plastic films, optionally after aftertreatment such as drying and curing.

To ensure particularly good fastnesses such as for example dry rub fastness (wet rub fastness and wash fastness) for printed substrates, prints can be fixed through so-called radiation curing. So-called radiation-curable liquid inks may be employed for this purpose, see for example U.S. Pat. No. 5,623,001 and EP 0 993 495. Radiation-curable inks typically comprise a material which can be cured by subjecting it to actinic radiation. In addition, a photoinitiator may be included in radiation-curable inks.

WO 2006/089933 discloses aqueous dispersions comprising radiation-curable polyurethanes comprising allophanate groups, and also the use of said dispersions in ink jet inks. Printing the disclosed ink jet inks and applying actinic radiation gives printed substrates having very good fastnesses.

The present invention has for its object to provide printing inks for printing processes which are particularly efficiently curable by the application of actinic radiation and/or thermally and also have a long shelf life as well as improved water resistance, gloss, and/or adhesion. Furthermore, a good heat-seal resistance is required, especially on LDPE (low-density polyethylene), HDPE and OPP (oriented polypropylene). The polyurethanes should also exhibit a good compatibility with pigments.

In the context of this application "heat-seal resistance" means the ability of a printed ink on a certain substrate to withstand the heat-sealing process, which is applied to the printed substrate in order to close the packaging (at a certain temperature and dwelltime).

We have found that this object is achieved by the use of aqueous dispersions defined at the beginning. The use according to the present invention relates to printing inks used in printing processes such as ink jet processes and other than ink jet processes, preferably other than ink jet processes, very preferably for flexographic printing processes and/or gravure printing processes.

The term "printing ink" is used herein as a collective designation of colorant-containing preparations of varying consistency which are applied exclusively by means of a printing plate to a printing stock and are fixed there as ink film (print) (CEPE definition).

Polyurethanes shall for the purposes of the present invention be understood as meaning not just such polymers as are exclusively linked by urethane groups but in a more general sense polymers obtainable by reaction of di- or polyisocyanates with compounds comprising active hydrogen atoms. Polyurethanes for the purposes of the present invention thus may comprise urea, allophanate, biuret, carbodiimide, amide, ester, ether, uretoneimine, uretidione, isocyanurate or oxazolidine groups as well as urethane groups. As a general reference there may be cited by way of example: Kunststoffhandbuch/Saechtling, 26th edition, Carl-Hanser-Verlag, Munich 1995, pages 491 et seq. More particularly, polyurethanes for the purposes of the present invention comprise allophanate groups.

In one embodiment of the present invention, the polyurethane (A) is not a hyperbranched polyurethane. Hyperbranched polyurethanes are known as such and are described for example in J.M.S.—Rev. Macromol. Chem. Phys. 1997, C37(3), 555.

Aqueous dispersions according to the present invention are preferably produced from organic pigments, which comprises carbon black. White pigments are similarly preferred, in particular titanium dioxide. Examples of particularly suitable pigments (B) will now be recited.

Organic Pigments:
  Monoazo pigments: C.I. Pigment Brown 25; C.I. Pigment Orange 5, 13, 36 and 67; C.I. Pigment Red 1, 2, 3, 5, 8, 9, 12, 17, 22, 23, 31, 48:1, 48:2, 48:3, 48:4, 49, 49:1, 52:1, 52:2, 53, 53:1, 53:3, 57:1, 63, 112, 146, 170, 184, 210, 245 and 251; C.I. Pigment Yellow 1, 3, 73, 74, 65, 97, 151 and 183;
  Disazo pigments: C.I. Pigment Orange 16, 34 and 44; C.I. Pigment Red 144, 166, 214 and 242; C.I. Pigment Yellow 12, 13, 14, 16, 17, 81, 83, 106, 113, 126, 127, 155, 174, 176 and 188;
  Anthanthrone pigments: C.I. Pigment Red 168 (C.I. Vat Orange 3);
  Anthraquinone pigments: C.I. Pigment Yellow 147 and 177; C.I. Pigment Violet 31;
  Anthraquinone pigments: C.I. Pigment Yellow 147 and 177; C.I. Pigment Violet 31;
  Anthrapyrimidine pigments: C.I. Pigment Yellow 108 (C.I. Vat Yellow 20);
  Quinacridone pigments: C.I. Pigment Red 122, 202 and 206; C.I. Pigment Violet 19;

Quinophthalone pigments: C.I. Pigment Yellow 138;
Dioxazine pigments: C.I. Pigment Violet 23 and 37;
Flavanthrone pigments: C.I. Pigment Yellow 24 (C.I. Vat Yellow 1);
Indanthrone pigments: C.I. Pigment Blue 60 (C.I. Vat Blue 4) and 64 (C.I. Vat Blue 6);
Isoindoline pigments: C.I. Pigment Orange 69; C.I. Pigment Red 260; C.I. Pigment Yellow 139 and 185;
Isoindolinone pigments: C.I. Pigment Orange 61; C.I. Pigment Red 257 and 260; C.I. Pigment Yellow 109, 110, 173 and 185;
Isoviolanthrone pigments: C.I. Pigment Violet 31 (C.I. Vat Violet 1);
Metal complex pigments: C.I. Pigment Yellow 117, 150 and 153; C.I. Pigment Green 8;
Perinone pigments: C.I. Pigment Orange 43 (C.I. Vat Orange 7); C.I. Pigment Red 194 (C.I. Vat Red 15);
Perylene pigments: C.I. Pigment Black 31 and 32; C.I. Pigment Red 123, 149, 178, 179 (C.I. Vat Red 23), 190 (C.I. Vat Red 29) and 224; C.I. Pigment Violet 29;
Phthalocyanine pigments: C.I. Pigment Blue 15, 15:1, 15:2, 15:3, 15:4, 15:6 and 16; C.I. Pigment Green 7 and 36;
Pyranthrone pigments: C.I. Pigment Orange 51; C.I. Pigment Red 216 (C.I. Vat Orange 4);
Thioindigo pigments: C.I. Pigment Red 88 and 181 (C.I. Vat Red 1); C.I. Pigment Violet 38 (C.I. Vat Violet 3);
Triarylcarbonium pigments: C.I. Pigment Blue 1, 61 and 62; C.I. Pigment Green 1; C.I. Pigment Red 81, 81:1 and 169; C.I. Pigment Violet 1, 2, 3 and 27; C.I. Pigment Black 1 (aniline black);
C.I. Pigment Yellow 101 (aldazine yellow);
C.I. Pigment Brown 22.

Inorganic Pigments:
White pigments: titanium dioxide (C.I. Pigment White 6), zinc white, pigmented zinc oxide, barium sulfate, zinc sulfide, lithopones; lead white; calcium carbonate;
Black pigments: iron oxide black (C.I. Pigment Black 11), iron-manganese black, spinell black (C.I. Pigment Black 27); carbon black (C.I. Pigment Black 7);
Color pigments: chromium oxide, chromium oxide hydrate green; chromium green (C.I. Pigment Green 48); cobalt green (C.I. Pigment Green 50); ultramarine green; cobalt blue (C.I. Pigment Blue 28 and 36); ultramarine blue; iron blue (C.I. Pigment Blue 27); manganese blue; ultramarine violet; cobalt and manganese violet; iron oxide red (C.I. Pigment Red 101); cadmium sulfoselenide (C.I. Pigment Red 108); molybdate red (C.I. Pigment Red 104); ultramarine red;
Iron oxide brown, mixed brown, spinell and corundum phases (C.I. Pigment Brown 24, 29 and 31), chromium orange;
Iron oxide yellow (C.I. Pigment Yellow 42); nickel titanium yellow (C.I. Pigment Yellow 53; C.I. Pigment Yellow 157 and 164); chromium titanium yellow; cadmium sulfide and cadmium zinc sulfide (C.I. Pigment Yellow 37 and 35); chromium yellow (C.I. Pigment Yellow 34), zinc yellow, alkaline earth metal chromates; Naples yellow; bismuth vanadate (C.I. Pigment Yellow 184);
Interference pigments: metallic effect pigments based on coated metal platelets; pearl luster pigments based on metal oxide coated mica platelets; liquid crystal pigments.

Preferred pigments (B) in this context are monoazo pigments (especially laked BONS pigments, P Naphthol AS pigments), disazo pigments (especially diary) yellow pigments, bisacetoacetanilide pigments, disazopyrazolone pigments), quinacridone pigments, quinophthalone pigments, perinone pigments, phthalocyanine pigments, triarylcarbonium pigments (alkali blue pigments, laked rhodamines, dye salts with complex anions), isoindoline pigments, white pigments and carbon blacks.

Examples of particularly preferred pigments (B) are specifically: carbon black, titanium dioxide, C.I. Pigment Yellow 138, C.I. Pigment Red 122 and 146, C.I. Pigment Violet 19, C.I. Pigment Blue 15:3 and 15:4, C.I. Pigment Black 7, C.I. Pigment Orange 5, 38 and 43 and C.I. Pigment Green 7.

In one embodiment of the present invention, polyurethane (A) has a glass transition temperature, determinable by differential scanning calorimetry (DSC) for example, of not more than 50° C. and preferably of not more than 40° C., determined according to ASTM 3418/82 at a heating rate of 10° C./min.

Polyurethanes (A) for the purposes of the present invention are obtainable by reaction of
(a) 15% to 70% by weight, preferably 30% to 60% by weight, of di- or polyisocyanate comprising on average from 1 to 10 allophanate groups and on average from 1 to 10 C—C double bonds per molecule, average values each preferably being based on the number average, with
(b) optionally 0 to 60% by weight, preferably up to 20% by weight, of further di- or polyisocyanate, and
(c) 5% to 50% by weight, preferably 30% to 50% by weight, of compounds having at least one isocyanate-reactive group, comprising at least one polycarbonate diol with a molecular weight from 500 to 3000 g/mol.

At least one di- or polyisocyanate (a) which comprises on average from 1 to 10 and preferably up to 5 allophanate groups and on average per molecule from 1 to 10 and preferably up to 5 C—C double bonds per molecule, average values each being based on the weight average and preferably on the number average, is a compound which is preferably prepared in the presence of a catalyst, from at least one diisocyanate (a1) with at least one compound of the general formula I

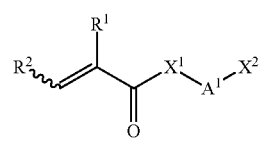

herein also referred to as compound (a2) for short, the variables being defined as follows:

$R^1$ and $R^2$ are the same or different and are independently selected from hydrogen and $C_1$-$C_{10}$-alkyl, such as for example methyl, ethyl, n-propyl, iso-propyl, n-butyl, isobutyl, sec-butyl, tert-butyl, n-pentyl, isopentyl, sec-pentyl, neo-pentyl, 1,2-dimethylpropyl, isoamyl, n-hexyl, isohexyl, sec-hexyl, n-heptyl, n-octyl, 2-ethylhexyl, n-nonyl, n-decyl; more preferably $C_1$-$C_4$-alkyl such as methyl, ethyl, n-propyl, isopropyl, n-butyl, isobutyl, sec-butyl and tert-butyl, in particular methyl;

$X^1$ is selected from oxygen and N—$R^3$, $A^1$ is selected from $C_1$-$C_{20}$-alkylene, preferably $C_2$-$C_{10}$-alkylene, for example —$CH_2$—, —$(CH_2)_{12}$—, —$(CH_2)_{14}$—, —$(CH_2)_{16}$—, —$(CH_2)_{20}$—, preferably —$(CH_2)_2$—, —$(CH_2)_3$—, —$(CH_2)_4$—, —$(CH_2)_5$—, —$(CH_2)_6$—, —$(CH_2)_8$—, —$(CH_2)_{10}$—, unsubstituted or singly or multiply substituted by $C_1$-$C_4$-alkyl, for example methyl, ethyl, n-propyl, isopropyl, n-butyl, isobutyl, sec-butyl or tert-butyl, preferably methyl, phenyl or —O—$C_1$-$C_4$-alkyl, for example —O—$CH_3$, —O—$C_2H_5$, —O-n-$C_3H_7$, —O—$CH(CH_3)_2$, —O-n-$C_4H_9$, —O-iso-$C_4H_9$, —O-sec-$C_4H_9$, —O—$C(CH_3)_3$, by way of substituted $C_1$-$C_{20}$-alkylene there may be mentioned for example —$CH(CH_3)$—, —$CH(C_2H_5)$—, —$CH(C_6H_5)$—, —$CH_2$—$CH(CH_3)$—, cis- and trans-$CH(CH_3)$—$CH(CH_3)$—, —$(CH_2)$—$C(CH_3)_2$—$CH_2$—, —$CH_2$—$CH(C_2H_6)$—, —$CH_2$—$CH$(n-$C_3H_7$)—, —$CH_2$—$CH$(iSo-$C_3H_7$)—, wherein substituted or unsubstituted $C_1$-$C_{20}$-alkylene one or more nonadjacent $CH_2$ groups may be replaced by oxygen, examples being —$CH_2$—O—$CH_2$—, —$(CH_2)_2$—O—$(CH_2)_2$—, —$[(CH_2)_2$—O$]_2$—$(CH_2)_2$—, —$[(CH_2)_2$—O$]_3$—$(CH_2)_2$.

$X^2$ is selected from NH—$R^3$ and preferably oxygen, $R^3$ is in each occurrence different or preferably the same and selected from hydrogen, phenyl and $C_1$-$C_{10}$-alkyl such as for example methyl, ethyl, n-propyl, isopropyl, n-butyl, isobutyl, sec-butyl, tert-butyl, n-pentyl, isopentyl, sec-pentyl, neo-pentyl, 1,2-dimethylpropyl, isoamyl, n-hexyl, isohexyl, n-heptyl, n-octyl, 2-ethylhexyl, n-nonyl, n-decyl; more preferably $C_1$-$C_4$-alkyl such as methyl, ethyl, n-propyl, isopropyl, n-butyl, isobutyl, sec-butyl and tert-butyl, in particular methyl.

Very particularly preferred compounds of the general formula I are 2-hydroxyethyl (meth)acrylate and 3-hydroxypropyl (meth)acrylate, in particular 2-hydroxyethyl (meth)acrylate.

In a very preferred embodiment the allophanat group bearing polyisocyanate (a) is of formula (Ia)

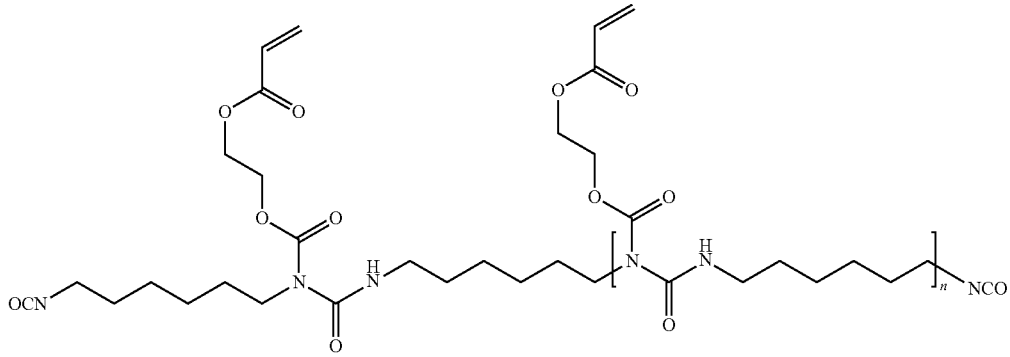

wherein n is a positive number which mean average is from 1 to 5, preferably from 1 to 3.

Polyurethane (A) may be prepared in the presence of at least one catalyst or preferably in the absence of a catalyst.

Useful catalysts include for example all catalysts typically used in polyurethane chemistry.

Catalysts typically used in polyurethane chemistry are preferably organic amines, especially tertiary aliphatic, cycloaliphatic or aromatic amines, and Lewis-acidic organic metal compounds.

Useful Lewis-acidic organic metal compounds include for example tin compounds, for example tin(II) salts of organic carboxylic acids, examples being tin(II) acetate, tin(II) octoate, tin(II) ethylhexanoate and tin(II) laurate and the dialkyltin(IV) derivatives of organic carboxylic acids, examples being dimethyltin diacetate, dibutyltin diacetate, dibutyltin dibutyrate, dibutyltin bis(2-ethylhexanoate), dibutyltin dilaurate, dibutyltin maleate, dioctyltin dilaurate and dioctyltin diacetate. Metal complexes such as acetyl acetonates of iron, of titanium of zinc, of aluminum, of zirconium, of manganese, of nickel and of cobalt are possible as well. Further useful metal compounds are described by Blank et al. in Progress in Organic Coatings, 1999, 35, 19 ff.

Dialkyltin(IV) salts of organic carboxylic acids are, for example, dimethyltin diacetate, dibutyltin diacetate, dibutyltin dibutyrate, dibutyltin bis(2-ethylhexanoate), dibutyltin dilaurate, dibutyltin maleate, dioctyltin dilaurate, and dioctyltin diacetate. Preference is given to dibutyltin diacetate and dibutyltin dilaurate. For toxicological reasons, tin salts are less preferred, but are still frequently used in practice.

Other preferred Lewis-acidic organometallic compounds are zinc(II) dioctoate, zirconium acetylacetonate, and zirconium 2,2,6,6-tetramethyl-3,5-heptanedionate.

Bismuth and cobalt catalysts, cerium salts such as cerium octoates, and cesium salts can also be used as catalysts.

Bismuth catalysts are more particularly bismuth carboxylates, especially bismuth octoates, ethylhexanoates, neodecanoates or pivalates; examples are K-KAT 348 and XK-601 from King Industries, TIB KAT 716, 716LA, 716XLA, 718, 720, 789 from TIB Chemicals, and those from Shepherd Lausanne, and also catalyst mixtures of, for example, bismuth organyls and zinc organyls.

Preferred Lewis-acidic organic metal compounds are dimethyltin diacetate, dibutyltin dibutyrate, dibutyltin bis(2-ethylhexanoate), dibutyltin dilaurate, dioctyltin dilaurate, zirconium acetylacetonate and zirconium 2,2,6,6-tetramethyl-3,5-heptanedionate.

Very preferred Lewis-acidic organic metal compounds are bismuth octoates, ethylhexanoates, neodecanoates or pivalates, zirconium acetylacetonate and zirconium 2,2,6,6-tetramethyl-3,5-heptanedionate.

In an especially preferred embodiment a non-tin containing Lewis-acidic organic metal compound is used as a catalyst.

Similarly, bismuth, zinc and cobalt catalysts and also cesium salts can be used as hydrophilic catalysts. Useful cesium salts include those compounds utilizing the following anions: $F^-$, $Cl^-$, $ClO^-$, $ClO_3^-$, $ClO_4^-$, $Br^-$, $J^-$, $JO_3^-$, $CN^-$, $OCN^-$, $NO_2^-$, $NO_3^-$, $HCO_3^-$, $CO_3^{2-}$, $S^{2-}$, $SH^-$, $HSO_3^-$, $SO_3^{2-}$, $HSO_4^-$, $SO_4^{2-}$, $S_2O_2^{2-}$, $S_2O_4^{2-}$, $S_2O_5^{2-}$, $S_2O_6^{2-}$, $S_2O_7^{2-}$, $S_2O_8^{2-}$, $H_2PO_2^-$, $H_2PO_4^-$, $HPO_4^{2-}$, $PO_4^{3-}$, $P_2O_7^{4-}$, $(OC_nH_{2n+1})^-$, $(C_nH_{2n-2})^-$, $(C_nH_{2n-3}O_2)^-$ and $(C_{n+1}H_{2n-2}O_4)^{2-}$, where n represents integers from 1 to 20.

Preference is given to bismuth carboxylates, zinc carboxylates and cesium carboxylates in which the anion conforms to the formulae $(C_nH_{2n-1}O_2)^-$ and also $(C_{n+1}H_{2n-2}O_4)^{2-}$ where n is from 1 to 20. Particularly preferred cesium salts comprise monocarboxylates of the general formula $(C_nH_{2n-1}O_2)^-$, where n represents integers from 1 to 20, as anions. Formate, acetate, propionate, hexanoate, 2-ethylhexanoate, n-octanoate and neodecanoate must be mentioned in particular here.

As customary organic amines there may be mentioned by way of example: triethylamine, 1,4-diazabicyclo[2,2,2]octane, tributylamine, dimethylbenzylamine, N,N,N',N'-tetramethylethylene-diamine, N,N,N',N'-tetramethylbutane-1,4-diamine, N,N,N',N'-tetramethylhexane-1,6-diamine, dimethylcyclohexylamine, dimethyldodecylamine, pentamethyldipropylenetriamine, pentamethyldiethylenetriamine, 3-methyl-6-dimethylamino-3-azapentol, dimethylaminopropylamine, 1,3-bisdimethylaminobutane, bis(2-dimethylaminoethyl) ether, N-ethylmorpholine, N-methylmorpholine, N-cyclohexylmorpholine, 2-dimethylaminoethoxyethanol, dimethylethanolamine, methyldiethanolamine, tetramethylhexamethylenediamine, dimethylamino-N-methylethanolamine, N-methylimidazole, N-formyl-N,N'-dimethylbutylenediamine, N-dimethylaminoethyl-morpholine, 3,3'-bisdimethylamino-di-n-propylamine and/or 2,2'-dipiparazine diisopropyl ether, dimethylpiparazine, tris(N,N-dimethylaminopropyl)-s-hexahydrotriazine, imidazoles such as 1,2-dimethylimidazole, 4-chloro-2,5-dimethyl-1-(N-methylaminoethyl)imidazole, 2-aminopropyl-4,5-dimethoxy-1-methylimidazole, 1-aminopropyl-2,4,5-tributylimidazole, 1-aminoethyl-4-hexylimidazole, 1-aminobutyl-2,5-dimethylimidazole, 1-(3-aminopropyl)-2-ethyl-4-methylimidazole, 1-(3-aminopropyl)imidazole and/or 1-(3-aminopropyl)-2-methylimidazole.

Preferred organic amines are trialkylamines having independently two $C_1$- to $C_4$-alkyl radicals and one alkyl or cycloalkyl radical having 4 to 20 carbon atoms, for example dimethyl-$C_4$-$C_{15}$-alkylamine such as dimethyldodecylamine or dimethyl-$C_3$-$C_8$-cycloalkylamine. Likewise preferred organic amines are bicyclic amines which may optionally comprise a further heteroatom such as oxygen or nitrogen such as for example 1,4-diazabicyclo[2,2,2]octane.

It is particularly preferable to use ammonium acetate or triethylamine and most preferable to use N,N,N-trimethyl-N-(2-hydroxypropyl)ammonium 2-ethylhexanoate.

It will be appreciated that mixtures of two or more of the aforementioned compounds may be used as catalysts as well.

Particular preference is given to using such catalysts selected from the aforementioned compounds as are soluble in organic solvents such as acetone, tetrahydrofuran (THF), N-methylpyrrolidone and/or N-ethylpyrrolidone.

If a catalyst is used, this catalyst is preferably used in an amount from 0.0001% to 10% by weight and more preferably in an amount from 0.001% to 5% by weight, based on diisocyanate (a1). As mentioned above, in a preferred embodiment no catalyst is used.

The catalyst or catalysts may be added in solid or liquid form or in solution, depending on the constitution of the catalyst or catalysts. Useful solvents include water-immiscible solvents such as aromatic or aliphatic hydrocarbons such as for example toluene, ethyl acetate, hexane and cyclohexane and also carboxylic esters such as for example ethyl acetate, useful solvents further including acetone, THF and N-methylpyrrolidone and N-ethylpyrrolidone. The catalyst or catalysts is or are preferably added in solid or liquid form and most preferably in solution in organic solvents such as acetone, tetrahydrofuran (THF), N-methylpyrrolidone or Methylpyrrolidone.

Diisocyanate (a1) is selected for example from aliphatic, aromatic and cycloaliphatic diisocyanates. Examples of aromatic diisocyanates are 2,4-tolylene diisocyanate (2,4-TDI), 2,4'-diphenylmethane diisocyanate (2,4'-MDI) and so-called TDI mixtures (mixtures of 2,4-tolylene diisocyanate and 2,6-tolylene diisocyanate).

Examples of aliphatic diisocyanates are 1,4-butylene diisocyanate, 1,12-dodecamethylene diisocyanate, 1,10-decamethylene diisocyanate, 2-butyl-2-ethylpentamethylene diisocyanate, 2,4,4-trimethylhexamethylene diisocyanate or 2,2,4-trimethylhexamethylene diisocyanate and in particular hexamethylene diisocyanate (HDI).

Examples of cycloaliphatic diisocyanates are isophorone diisocyanate (IPDI), 2-isocyanato-propylcyclohexyl isocyanate, 2,4'-methylenebis(cyclohexyl) diisocyanate and 4-methylcyclohexane 1,3-diisocyanate (H-TDI).

Further examples of isocyanates having groups of differing reactivity are 1,3-phenylene diisocyanate, 1,4-phenylene diisocyanate, 1,5-naphthylene diisocyanate, diphenyl diisocyanate, tolidine diisocyanate and 2,6-tolylene diisocyanate.

Mixtures of the aforementioned diisocyanates can be used, of course.

Diisocyanate (a1) and compound (a2) can be employed in molar ratios of for example from 20:1 to 1:1 and preferably from 15:1 to 10:1.

In one embodiment of the present invention, diisocyanate (a1) and compound (a2) can be reacted with each other at temperatures in the range from 20° C. to 150° C. and preferably from 50 to 130° C.

In one embodiment of the present invention, diisocyanate (a1) and compound (a2) can be in solvent, preferably in an organic solvent or a mixture of organic solvents such as for example toluene, acetone or tetrahydrofuran or mixtures thereof. In another embodiment of the present invention, the reaction of diisocyanate (a1) with compound (a2) is carried out without use of solvent.

In one embodiment of the present invention, the reaction conditions for the reaction of diisocyanate (a1) with compound (a2), for example the molar ratios of diisocyanate (a1) and compound (a2), are chosen such that diisocyanate (a) has 2 isocyanate groups and from 1 to 10 allophanate groups and from 1 to 10 C—C double bonds but no O—CO—NH groups. In another embodiment of the present invention, the reaction conditions for the reaction of diisocyanate (a1) with compound (a2), for example the molar ratios of diisocyanate (a1) and compound (a2), are chosen such that diisocyanate (a) has 2 isocyanate groups and from 1 to 9 allophanate groups and from 1 to 9 C—C double bonds and also one or more O—CO—NH groups.

After the reaction of diisocyanate (a1) with compound (a2) has ended, di- or polyisocyanate (a) can be isolated, for example by removing unconverted starting materials such as diisocyanate (a1) or compound (a2). A suitable method of removing unconverted starting materials such as diisocyanate (a1) and compound (a2) is to distill them out, preferably at reduced pressure. Thin film evaporators are very particularly suitable. Unconverted diisocyanate (a1) is preferably not removed by distillation.

In one embodiment of the present invention, di- or polyisocyanate (a), especially compound (1a), has a dynamic viscosity at 23° C. in the range from 500 to 2000 mPa·s, preferably in the range from 600 to 1800 mPa·s and most preferably in the range from 700 to 1500 mPa·s.

In one embodiment of the present invention, di- or polyisocyanate (a) has an NCO content in the range from 8% to 20% by weight and preferably in the range from 12% to 17% by weight, determinable by titration for example.

Polyurethane (A) is prepared by reacting di- or polyisocyanate (a) with at least one further di- or polyisocyanate (b). Di- or polyisocyanate (b) can be selected from the abovementioned aliphatic, aromatic and cycloaliphatic diisocyanates.

In one embodiment of the present invention, di- or polyisocyanate (b) is chosen so that it is other than diisocyanate (a1).

In one embodiment of the present invention, di- or polyisocyanate (b) is chosen so that it is like diisocyanate (a1). One specific embodiment of the present invention comprises selecting di- or polyisocyanate (b) to be like diisocyanate (a1) by not separating from unconsumed diisocyanate (a1) after the preparation of di- or polyisocyanate (a) has ended.

Polyurethane (A) is further prepared by reacting with at least one polycarbonate diol (c1) with a molecular weight from 500 to 3000 g/mol.

Polycarbonate diols (c1) have an OH functionality of exactly 2 and preferably are compounds (c1) which fulfill formula (II)

wherein $R^5$ is a divalent aliphatic or cycloaliphatic, preferably aliphatic radical comprising 2 to 20 carbon atoms and x is a positive integer from 2 to 20, preferably from 3 to 15.

Such polycarbonate diols (c1) are obtainable by reaction of (c1a) phosgene, diphosgene or triphosgene with an aliphatic, aliphatic/aromatic or aromatic alcohol with a functionality of 2 or by reaction of at least one organic carbonate of general formula RO[(CO)O]$_n$R with at least one aliphatic, aliphatic/aromatic or aromatic alcohol (c1 b) containing exactly 2 OH groups, with elimination of alcohols ROH, R, independently at each occurrence, being a straight-chain or branched aliphatic, aromatic/aliphatic or aromatic hydrocarbon radical having 1 to 20 carbon atoms, and it also being possible for the radicals R to be joined to one another to form a ring, and n is an integer from 1 to 5.

Starting material (c1a) used can be phosgene, diphosgene or triphosgene, preferably phosgene among these, although it is preferred to use organic carbonates as compound (c1a).

The radicals R of the organic carbonate of the general formula RO[(CO)O]$_n$R are in each case independently of one another a straight-chain or branched aliphatic hydrocarbon radical having 1 to 20 carbon atoms, aromatic/aliphatic (araliphatic) or aromatic hydrocarbon radical having 7 to 20 carbon atoms. The two radicals R may be identical or different; preferably they are identical. Each R is preferably an aliphatic hydrocarbon radical and more preferably a straight-chain or branched alkyl radical having 1 to 5 carbon atoms, or a substituted or unsubstituted phenyl radical.

R is a straight-chain or branched, preferably straight-chain, (cyclo)aliphatic, aromatic/aliphatic or aromatic, preferably (cyclo)aliphatic or aromatic, more preferably aliphatic hydrocarbon radical having 1 to 20 carbon atoms, preferably 1 to 12, more preferably 1 to 6, and very preferably 1 to 4 carbon atoms.

Examples thereof are methyl, ethyl, isopropyl, n-propyl, n-butyl, isobutyl, sec-butyl, tert-butyl, n-hexyl, n-heptyl, n-octyl, n-decyl, n-dodecyl, n-tetradecyl, n-hexadecyl, n-octadecyl, n-eicosyl, 2-ethylhexyl, cyclopentyl, cyclohexyl, cyclooctyl, cyclododecyl, phenyl, o- or p-tolyl or naphthyl. Preference is given to methyl, ethyl, n-butyl, and phenyl.

The radicals R can be identical or different; preferably they are identical.

The radicals R can also be joined to one another to form a ring. Examples of divalent radicals R of this kind are 1,2-ethylene, 1,2-propylene, and 1,3-propylene.

In general n is an integer from 1 to 5, preferably from 1 to 3, more preferably from 1 to 2.

The carbonates can especially preferably be simple carbonates of the general formula RO(CO)OR; in this case, in other words, n is 1.

Dialkyl or diaryl carbonates can be prepared for example from the reaction of aliphatic, araliphatic or aromatic alcohols, preferably monoalcohols, with phosgene. Additionally they can also be prepared by oxidative carbonylation of the alcohols or phenols by means of CO in the presence of noble metals, oxygen or NON. On preparation methods of diaryl or dialkyl carbonates see also "Ullmann's Encyclopedia of Industrial Chemistry", 6th Edition, 2000 Electronic Release, Verlag Wiley-VCH.

For the invention no significant part is played by the manner in which the carbonate has been prepared.

Examples of suitable carbonates comprise aliphatic, aromatic/aliphatic or aromatic carbonates such as ethylene carbonate, 1,2- or 1,3-propylene carbonate, diphenyl carbonate, ditolyl carbonate, dixylyl carbonate, dinaphthyl carbonate, ethyl phenyl carbonate, dibenzyl carbonate, dimethyl carbonate, diethyl carbonate, di-n-propyl carbonate, di-n-butyl carbonate, diisobutyl carbonate, dipentyl carbonate, dihexyl carbonate, dicyclohexyl carbonate, diheptyl carbonate, dioctyl carbonate, didecyl carbonate or didodecyl carbonate.

Examples of carbonates where n is greater than 1 comprise dialkyl dicarbonates, such as di(tert-butyl) dicarbonate, or dialkyl tricarbonates such as di(tert-butyl) tricarbonate.

Preference is given to using aliphatic carbonates, especially those where the radicals comprise 1 to 5 carbon atoms, such as, for example, dimethyl carbonate, diethyl carbonate, di-n-propyl carbonate, di-n-butyl carbonate or diisobutyl carbonate. One preferred aromatic carbonate is diphenyl carbonate.

The organic carbonates are reacted with at least one aliphatic, cycloaliphatic alcohol which contains exactly 2 OH groups, or with mixtures of two or more different alcohols.

Examples of suitable compounds (c1 b) having 2 OH groups comprise ethylene glycol, diethylene glycol, triethylene glycol, 1,2- and 1,3-propanediol, dipropylene glycol, tripropylene glycol, neopentyl glycol, 2-butyl-2-ethyl-1,3-propanediol, 1,2-, 1,3- and 1,4-butanediol, 1,2-, 1,3- and 1,5-pentanediol, 1,6-hexanediol, 1,2- or 1,3-cyclopentanediol, 1,2-, 1,3- or 1,4-cyclohexanediol, 1,1-, 1,2-, 1,3- or 1,4-cyclohexanedimethanol, bis(4-hydroxycyclohexyl)methane, bis(4-hydroxycyclohexyl)ethane, 2,2-bis(4-hydroxycyclohexyl)propane, 1,1'-bis(4-hydroxyphenyl)-3,3,5-trimethylcyclohexane.

Preferred compounds (c1b) are 1,2- and 1,3-propanediol, 2-butyl-2-ethyl-1,3-propanediol, 1,4-butanediol, and 1,6-hexanediol.

The reaction of phosgene, diphosgene or triphosgene with the alcohol or alcohol mixture takes place in general with elimination of hydrogen chloride; the reaction of the carbonates with the alcohol or alcohol mixture to give the polycarbonate diol takes place with elimination of the monofunctional alcohol or phenol from the carbonate molecule.

The polycarbonate diols formed by the process described are terminated after the reaction, i.e., without further modification, with hydroxyl groups and with carbonate groups or carbamoyl chloride groups. They dissolve readily in a variety of solvents.

Examples of such solvents are aromatic and/or (cyclo) aliphatic hydrocarbons and mixtures thereof, halogenated hydrocarbons, ketones, esters and ethers.

Preference is given to aromatic hydrocarbons, (cyclo) aliphatic hydrocarbons, alkyl alkanoates, ketones, alkoxylated alkyl alkanoates, and mixtures thereof.

Compound (c) may optional further comprise at least one compound (c2) bearing at least one, preferably at least two groups reactive against isocyanate, preferably hydroxy groups and at least one, preferably exactly one acid group, preferably at least one sulfonic or carboxylic acid group. Preferred compounds (c2) are selected from 1,1,1-trimethylol-$C_1$-$C_4$-alkylcarboxylic acids, for example 1,1,1-trimethylol acetic acid, 1,1,1-trimethylolpropanoic acid, 1,1,1-trimethylolbutyric acid, citric acid, 2,2-dimethylol-$C_1$-$C_4$-alkylcarboxylic acids, for example 2,2-dimethylolaceticacid, 2,2-dimethylolpropanoic acid, 2,2-dimethylolbutyric acid, 2,2-dimethylol-$C_1$-$C_4$-alkylsulfonic acids, poly-$C_2$-$C_3$-alkylene glycols having on average from 3 to 300 alkylene oxide units per molecule, in particular polyethylene glycol having on average (number average) from 3 to 300 ethylene oxide units per molecule and polyaddition products of ethylene oxide and propylene oxide having on average (number average) from 3 to 300 ethylene oxide units per molecule and a molar fraction of ethylene oxide higher than the fraction of propylene oxide.

Compound (c) may optional further comprise at least one compound (c3) bearing exactly two groups reactive against isocyanate, preferably hydroxy groups and no further functional groups.

Examples of suitable compounds (c3) having two OH groups comprise ethylene glycol, diethylene glycol, triethylene glycol, 1,2- and 1,3-propanediol, dipropylene glycol, tripropylene glycol, neopentyl glycol, 2-butyl-2-ethyl-1,3-propanediol, 1,2-, 1,3- and 1,4-butanediol, 1,2-, 1,3- and 1,5-pentanediol, 1,6-hexanediol, 1,2- or 1,3-cyclopentanediol, 1,2-, 1,3- or 1,4-cyclohexanediol, 1,1-, 1,2-, 1,3- or 1,4-cyclohexanedimethanol, bis(4-hydroxycyclohexyl)methane, bis(4-hydroxycyclohexyl)ethane, 2,2-bis(4-hydroxycyclohexyl)propane, and 1,1'-bis(4-hydroxyphenyl)-3,3,5-trimethylcyclohexane. Very preferable are neopentyl glycol and 2-butyl-2-ethyl-1,3-propanediol.

In one embodiment of the present invention, polycarbonate diols used as compound (c) have a hydroxyl number in the range from 20 to 200 mg KOH/g, preferably in the range from 50 to 180 and most preferably in the range from 100 to 160 mg KOH/g, determined according to German standard specification DIN 53240.

In one embodiment of the present invention, polycarbonate diols used as compound (c) have a molecular weight $M_w$ in the range from 500 to 3000 g/mol, preferably in the range from 700 to 3000 g/mol and more preferably up to 2000 g/mol.

One embodiment of the present invention comprises synthesizing polyurethane (A) by further adding at least one compound (d) bearing at least one, preferably one or two, very preferably exactly one group reactive against isocyanate, preferably hydroxy groups, and at least one, preferably one or two (meth)acrylic groups.

In a preferred embodiment a compound (d) of the general formula I is present in the reaction of di- or polyisocyanate (a), and further di- or polyisocyanate (b), if present, with compound (c).

Compounds of the formula I are described above.

Preferred compounds (d) bear one or more groups which are reactive towards isocyante, preferably hydroxy groups and one or more (meth)acryl groups.

Compounds (d1) bearing one group reactive against isocyanate groups and one (meth)acryl group are 2-hydroxyethyl acrylate, 2-hydroxyethyl methacrylate, 2-hydroxybutyl acrylate and 2-hydroxypropyl acrylate.

It is also possible to further use compounds (d2) with two or more, preferably exactly two hydroxy groups and two or more, preferably exactly two (meth)acrylic groups.

Preferred compounds (d2) bearing two groups reactive against isocyanate groups are reaction products of (meth)acrylic acid with diglycidyl ethers, preferably aliphatic diglycidyl ethers, very preferably reaction products of acrylic acid with ethylene glycol diglycidyl ether, neopentylene glycol diglycidyl ether, butane-1,4-diol diglycidyl ether, hexane-1,6-diol diglycidyl ether, poly(tetrahydrofuran) diglycidyl ether or cyclohexane-1,4-dimethanol diglycidyl ether.

The thus obtained epoxy (meth)acrylates are particularly suitable as compounds (d2).

As compound (d) of the general formula I there may be used a compound of the general formula I other than for preparing di- or polyisocyanate (a) which on average comprises from 1 to 10 allophanate groups and on average from 1 to 10 C—C double bonds per molecule. Preferably, however, compound (d) and compound (a2) are identical.

The synthesis of polyurethane (A) can be carried out by conventional methods of polyurethane chemistry.

Aqueous dispersions of the present invention further comprise at least one polymerization inhibitor (C), also referred to as inhibitor (C) or stabilizer (C). Polymerization inhibitors (C) can be selected from UV absorbers and free-radical scavengers. UV absorbers convert UV radiation into thermal energy. Suitable UV absorbers include for example oxanilides, triazines and benzotriazole (the latter obtainable as Tinuvin® products from BASF SE), benzophenones, hydroxybenzophenones, hydroquinone, hydroquinone monoalkyl ethers such as for example hydroquinone monomethyl ether (MEHQ). Free-radical scavengers bind free-radicals formed as intermediates. Suitable free-radical scavengers include for example sterically hindered amines known as Hindered Amine Light Stabilizers (HALSs). Examples thereof are 2,2,6,6-tetramethylpiperidine, 2,6-di-tert-butylpiperidine or derivatives thereof, for example bis(2,2,6,6-tetramethyl-4-piperidyl) sebacate. Further useful polymerization inhibitors (C) are substituted phenols, particularly tert-alkyl-substituted phenols such as for example

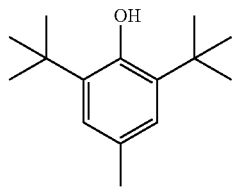

(C.1)

One embodiment of the present invention utilizes a mixture of two or more polymerization inhibitors (C), for example a hydroquinone ether and a substituted phenol.

For example, altogether up to 15% by weight, based on the sum total of (A) and (B), of polymerization inhibitor (C) can be added, more preferably from 0.01 to 1% by weight.

Polymerization inhibitor (C) can be added during the synthesis of polyurethane (A) or subsequently, for example in the course of the dispersing of pigment (B).

One embodiment of the present invention may utilize di- or polyisocyanate (a), further di- or polyisocyanate (b) and compound (c) and optionally further compound of the general formula I (d) in the following weight ratios, each based on total polyurethane (A):

15% to 70% by weight, preferably 30% to 60% by weight, of di- or polyisocyanate (a), 0 to 60% by weight, preferably to 20% by weight, of further di- or polyisocyanate (b), 5% to 50% by weight, preferably 30% to 50% by weight, of compound (c), 0 to 20% by weight, preferably to 10% by weight, of compound of the general formula I (d).

Each weight % age is based on total polyurethane (A).

In an especially preferred embodiment polyurethanes (A) are obtainable by reaction of
(a) 30 to 60% by weight, of di- or polyisocyanate comprising on average from 1 to 10 allophanate groups and on average from 1 to 10 C—C double bonds per molecule, average values each preferably being based on the number average, preferably a polyisocyanate of formula (Ia) with
(b) 0% to 20% by weight, preferably 1% to 10 of further di- or polyisocyanate,
(c1) 5% to 50% by weight, preferably 10% to 40% by weight, of at least one polycarbonate diol with a molecular weight from 500 to 3000 g/mol,
(c2) 2 to 20, preferably 5 to 10% by weight of at least one compound (c2) bearing at least one group reactive against isocyanate and at least one acid group,
(c3) 0.5 to 10, preferably 1 to 5% by weight of at least one compound (c3) bearing exactly two groups reactive against isocyanate and no further functional groups,
(d1) 2 to 20, preferably 5 to 10% by weight of at least one compound bearing one group reactive against isocyanate groups and one (meth)acryl group,
(d2) 0.5 to 10, preferably 1 to 5% by weight of at least one compound (d2) with two or more hydroxy groups and two or more (meth)acrylic groups, and
(e) 0.5 to 10, preferably 1 to 5% by weight of at least one mono- or di-$C_1$-$C_4$-alkylamines, which may optionally bear hydroxy groups,
with the proviso that the sum is always 100% by weight.

One preferred version of the present invention comprises preparing polyisocyanate (A) by reacting not only di- or polyisocyanate (a), further di- or polyisocyanate (b) and compound (c) and optionally further compound of the general formula I (d) but additionally with at least one nucleophilic alcohol or amine, preferably monoalcohol or monoamine, which in either case may serve as a stopper and hereinafter is designated stopper (e). Examples of suitable stoppers (e) are mono- and di-$C_1$-$C_4$-alkylamines, which may optionally bear hydroxy groups, in particular diethylamine, 2-aminoethanol and N,N-diethanolamine. Up to 10% by weight of stopper (e) can be used, based on polyurethane (A) to be synthesized.

The preparation of polyurethane (A) from di- or polyisocyanate (a), further di- or polyisocyanate (b), compound (c) and optionally further compound of the general formula I (d) and optionally stopper (e) can be carried out in one or more stages. For example, di- or polyisocyanate (a), further di- or polyisocyanate (b) and compound (c) can be reacted in a first stage, preferably in the absence of a catalyst, the reaction stopped and thereafter again di- or polyisocyanate (b) and compound of the general formula I (d) and optionally stopper (e) added. It is also possible for example to react di- or polyisocyanate (a), further di- or polyisocyanate (b) and compound (c) with one another using an excess of further di- or polyisocyanate (b), and to stop the reaction by adding stopper (e).

In one embodiment of the present invention, di- or polyisocyanate (a), further di- or polyisocyanate (b), compound (c) and optionally further compound of the general formula I (d) and optionally stopper (e) can be reacted in a solvent, preferably in an organic solvent or a mixture of organic solvents such as for example toluene, acetone or tetrahydrofuran or mixtures thereof. In another embodiment of the present invention the reaction of di- or polyisocyanate (a), further di- or polyisocyanate (b), compound (c) and optionally further compound of the general formula I (d) and optionally stopper (e) is carried out without use of solvent.

One embodiment of the present invention comprises reacting di- or polyisocyanate (a), further di- or polyisocyanate (b) and compound (c) and optionally further compound of the general formula I (d) and optionally stopper (e) with one another at temperatures in the range from 20° C. to 150° C. and preferably in the range from 20 to 100° C.

To speed up the reaction of di- or polyisocyanate (a), further di- or polyisocyanate (b), compound (c) and optionally further compound of the general formula I (d) and optionally stopper (e), one or more catalysts can be used which is or are advantageously chosen from the aforementioned catalysts.

After the reaction of di- or polyisocyanate (a), further di- or polyisocyanate (b), compound (c) and optionally further compound of the general formula I (d) and optionally stopper (e) has ended, polyurethane (A) can be isolated, for example by removing unconverted starting materials such as di- or polyisocyanate (b), compound (c) and optionally further compound of the general formula I (d) and optionally stopper (e). A suitable method of removing unconverted starting materials such as (b) and (c) and optionally (d) and (e) is to distill them out, preferably at reduced pressure. Thin film evaporators are very particularly suitable. Preferably, unconverted di- or polyisocyanate (b) is not distilled out.

The molecular weight $M_w$ of the polyurethanes (A) can be for example in the range from 500 to not more than 50 000 g/mol, preferably in the range from 1000 to 30 000 g/mol, more preferably in the range from 2000 to 25 000 g/mol and most preferably at least 2000 g/mol, determined by gel permeation chromatography (GPC) for example.

In a preferred embodiment of the present invention, polyurethane (A) comprises no free NCO groups.

In a further embodiment of the present invention, polyurethanes (A) have an acid group content in the range from 0.2 to 3 mol/kg, preferably in the range from 0.4 to 2 and most preferably in the range from 0.4 to 1.5 mol/kg, based upon the sum of the compounds (a) to (c) and optional (d), (e), and/or (f).

In a preferred embodiment of the present invention the polyurethane (A) exhibits a double bond density of at least 0.5 mol/kg, preferably of at least 0.7 mol/kg, more preferably at least 1 mol/kg, very preferably at least 1.2 mol/kg and especially preferably at least 1.5 mol/kg. Usually the double bond density does not exceed 5 mol/kg, preferably it is less than 3 mol/kg.

With the "double bond density" the amount of acrylic and methacrylic groups (in sum) in the polyurethane (A) is meant.

After the reaction of di- or polyisocyanate (a), further di- or polyisocyanate (b) and compound (c) and optionally (d) and optionally stopper (e) has taken place, water can be added, for example in a weight ratio of polyurethane (A) to water in the range from 1:1 to 1:10.

After the reaction of di- or polyisocyanate (a), further di- or polyisocyanate (b) and compound (c) and optionally (d) and stopper (e) has taken place, groups comprising sufficiently acidic hydrogen atoms can be treated with bases to convert them into the corresponding salts. Useful bases include for example hydroxides and bicarbonates of alkali metals or alkaline earth metals or the carbonates of alkali metals. Useful bases further include volatile amines, i.e., amines having a boiling point of up to 180° C. at atmospheric pressure, examples being ammonia, methylamine, dimethylamine, trimethylamine, ethylamine, diethylamine, triethylamine, ethanolamine, N-methyldiethanolamine or triethanolamine. Similarly, basic groups can be converted with acids such as for example α-hydroxy carboxylic acids or α-amino acids or else α-hydroxy sulfonic acids into the corresponding salts.

After the reaction of di- or polyisocyanate (a), further di- or polyisocyanate (b) and compound (c) optionally (d) and stopper (e) has taken place, any organic solvent used can be separated off, for example by distillation.

After polyurethane (A) has been prepared, one or more pigments (B) and optionally water are optionally added. It is preferable to set a solids content in the range from to 10% to 80%, preferably to 65% and more preferably in the range from 30% to 60%.

The weight ratio of polyurethane (A) to pigment (B) can vary within wide limits. In one embodiment of the present invention, the weight ratio of polyurethane (A) to pigment (B) is in a range from 5:1 to 1:10, preferably from 3:1 to 1:8 and more preferably from 1:1 to 1:6. Optionally a further resin (D) (see below) can be present, in a preferred embodiment the pigment (B) is dispersed in the presence of a resin (D) and the polyurethane (A) is admixed at a later stage.

Polyurethane (A) and pigment (B) are subsequently dispersed. The dispersing can be effected in any apparatus suitable for dispersing. Shaking apparatuses such as for example from Skandex may be mentioned by way of example. Preferably, polyurethane (A) and pigment (B) are dispersed for example in ultrasonic apparatuses, high pressure homogenizers, 2-, 3-, 4- or 5-roll mills, minimills, Henschel mixers, shaking mills, Ang mills, gear mills, bead mills, wet mills, sand mills, attritors, colloid mills, ultrasonic homogenizers, with Ultra Turrax stirrer and in particular by grinding, for example in 2-, 3-, 4- or 5-roll mills, minimills, shaking mills, Ang mills, gear mills, bead mills, wet mills, sand mills, colloid mills, ball mills, specifically stirred ball mills.

The dispersing time is suitably in the range from 10 minutes to 48 hours for example, although a longer time is conceivable as well. Preference is given to a dispersing time in the range from 15 minutes to 24 hours.

Pressure and temperature conditions during the dispersing are generally not critical in that for example atmospheric pressure has been found to be suitable. As temperatures, for example temperatures in the range from 10° C. to 100° C. have been found to be suitable, preferably up to 90° C., very preferably up to 80° C.

The dispersing provides aqueous dispersion according to the present invention. In one embodiment of the present invention, aqueous dispersions according to the present invention have a solids content in the range from 10% to 80%, preferably up to 65% and more preferably in the range from 30% to 60%.

The average diameter of pigment (B) optionally at least partially enveloped by polyurethane (A) is typically in the range from 20 nm to 1.5 µm, preferably in the range from 60 to 500 nm and more preferably in the range from 60 to 350 nm after the dispersing and in connection with the present invention generally signifies the volume average. Useful measuring appliances for determining the average particle diameter include for example Coulter Counters, for example Coulter LS 230.

When it is desired to use carbon black according to the present invention as pigment (B), the particle diameter is based on the average diameter of the primary particles.

Aqueous dispersions according to the present invention comprise no thermal initiator, i.e., no compound which has a half-life of at least one hour at 60° C. and splits into free radicals in the process, examples being peroxides, hydroperoxides, hydrogen peroxide, persulfates, azo compounds such as for example azobisisobutyronitrile (AIBN) or water-soluble AIBN derivatives, highly substituted, in particular hexasubstituted, ethane derivatives or redox catalysts.

In one embodiment of the present invention, aqueous dispersions according to the present invention comprise at least one resin (D), preferably a styrene-acrylate copolymer or a polyurethane, different from polyurethane (A).

Styrene-acrylate copolymers are e.g. obtainable by free-radical polymerization which may comprise as monomers in interpolymerized form (i) at least one vinylaromatic monomer, preferably selected from the group consisting of styrene and alpha-methylstyrene, more preferably styrene, (ii) acrylic acid or methacrylic acid, preferably acrylic acid, and (iii) optionally at least one $C_1$- to $C_8$-alkyl ester of acrylic acid or methacrylic acid, herein referred to as (meth)acrylic acid, preferably acrylic acid, (iv) optionally monomers other than those mentioned under (i) to (iii) which are free-radically polymerizable, preferably 2-hydroxyethyl (meth)acrylate, acrylonitrile, acrylamide.

Preferred monomers (iii) are methyl acrylate, ethyl acrylate, n-butyl acrylate, 2-ethylhexyl acrylate, n-octyl acrylate, methyl methacrylate, ethyl methacrylate and n-butyl methacrylate.

Such copolymers can have a number average molecular weight Mw, determined by gel permeation chromatography in THF as solvent and polystyrene as standard, from 1000 to 1 500 000.

Typically, they have the following construction:
monomers (i): 20-80% by weight of styrene and/or alpha-methylstyrene
monomers (il): 1-45% by weight of acrylic acid and 0-10% by weight of methacrylic acid, and
monomers (ill): 0-30% by weight of n-butyl acrylate, 0-30% by weight of 2-ethylhexyl acrylate.

Such copolymers are preferably obtainable via bulk polymerization and emulsion polymerization, more preferably via bulk polymerization.

Preferred styrene-acrylate copolymers (D) are Joncryl® HPD resins obtainable from BASF.

Polyurethane (D) is obtainable for example by reaction of di- or polyisocyanate (b) with compound (c), but preferably comprises no allophanate groups. Particularly preferably pigment (B) is at least partially enveloped by polyurethane (D).

In one embodiment of the present invention, aqueous dispersions according to the present invention comprise polyurethane (A) and polyurethane (D) in the range from 10:1 to 1:2 and preferably in the range from 8:1 to 1:1 (weight ratio).

In one embodiment of the present invention, aqueous dispersions according to the present invention comprise at least one photoinitiator (E). Photoinitiator (E) can be added either before the dispersing or alternatively after the dispersing.

Suitable photoinitiators (E) include for example photoinitiators known to one skilled in the art, examples being those mentioned in "Advances in Polymer Science", Volume 14, Springer Berlin 1974 or in K. K. Dietliker, Chemistry and Technology of UV- and EB-Formulation for Coatings, Inks and Paints, Volume 3; Photoinitiators for Free Radical and Cationic Polymerization, P. K. T. Oldring (Eds), SITA Technology Ltd, London.

Useful photoinitiators include for example mono- or bisacylphosphine oxides as described for example in EP-A 0 007 508, EP-A 0 057 474, DE-A 196 18 720, EP-A 0 495 751 and EP-A 0 615 980, examples being 2,4,6-trimethyl-benzoyldiphenylphosphine oxide, ethyl 2,4,6-trimethylbenzoylphenylphosphinate, bis(2,4,6-trimethylbenzoyl)phenylphosphine oxide, benzophenone, hydroxyacetophenone, phenylglyoxylic acid and derivatives thereof or mixtures of the aforementioned photoinitiators. As examples there may be mentioned benzophenone, acetophenone, acetonaphthoquinone, valerophenone, hexanophenone, α-phenylbutyrophenone, p-morpholinopropiophenone, dibenzosuberone, 4-morpholinobenzophenone, 4-morpholinodeoxybenzoin, p-diacetylbenzene, 4-aminobenzophenone, 4'-methoxyacetophenone, β-methylanthraquinone, tert-butylanthraquinone, anthraquinonecarboxylic esters, benzaldehyde, α-tetralone, 9-acetylphenanthrene, 2-acetyl phenanthrene, 10-thioxanthenone, 3-acetylphenanthrene, 3-acetylindole, 9-fluorenone, 1-indanone, 1,3,4-triacetylbenzene, thioxanthen-9-one, xanthen-9-one, 2,4-dimethylthioxanthone, 2,4-diethylthioxanthone, 2,4-di-iso-propylthio-xanthone, 2,4-dichlorothioxanthone, benzoin, benzoin isobutyl ether, chloroxanthenone, benzoin tetrahydropyranyl ether, benzoin methyl ether, benzoin ethyl ether, benzoin butyl ether, benzoin isopropyl ether, 7-H-benzoin methyl ether, benz[de]anthracen-7-one, 1-naphthaldehyde, 4,4'-bis(diethylamino) benzophenone, 4-phenylbenzophenone, 4-chlorobenzophenone, Michler's ketone, 1-acetonaphthone, 2-acetonaphthone, 1-benzoylcyclohexan-1-ol, 2-hydroxy-2,2-dimethylacetophenone, 2,2-dimethoxy-2-phenylacetophenone, 2,2-diethoxy-2-phenylacetophenone, 1,1-dichloroacetophenone, 1-hydroxyacetophenone, acetophenone dimethyl ketal, o-methoxybenzophenone, triphenylphosphine, tri-o-tolylphosphine, benz[a]anthracene-7,12-dione, 2,2-diethoxyacetophenone, benzil ketals, such as benzil dimethyl ketal, 2-methyl-1-[4-(methylthio)phenyl]-2-morpholinopropan-1-one, anthraquinones such as 2-methylanthraquinone, 2-ethylanthraquinone, 2-tert-butylanthraquinone, 1-chloroanthraquinone, 2-amylanthraquinone and 2,3-butanedione.

Also suitable are nonyellowing or minimally yellowing photoinitiators of the phenylglyoxalic ester type, as described in DE-A 198 26 712, DE-A 199 13 353 or WO 98/33761.

Preferred photoinitiators (E) include for example photoinitiators which split upon activation, so-called α-splitters such as for example photoinitiators of the benzil dialkyl ketal type such as for example benzil dimethyl ketal. Further examples of useful α-splitters are derivatives of benzoin, isobutyl benzoin ether, phosphine oxides, especially mono- and bisacylphosphine oxides, for example benzoyldiphenylphosphine oxide, 2,4,6-trimethylbenzoyldiphenylphosphine oxide, α-hydroxyalkylacetophenones such as for example 2-hydroxy-2-methylphenylpropanone (E.1),

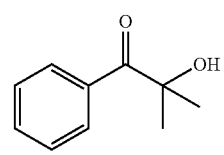

(E.1)

2-hydroxy-1-[4-(2-hydroxyethoxy)phenyl]-2-methyl-1-propanone (E.2)

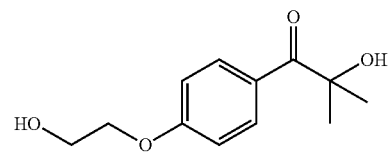

(E.2)

phosphine sulfides and ethyl 4-dimethylaminobenzoate and also (E.3)

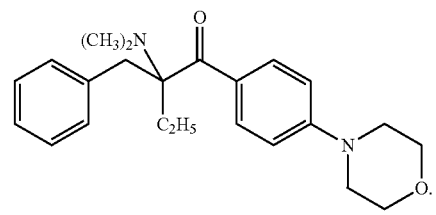

(E.3)

Preferred photoinitiators (E) further include for example hydrogen-abstracting photoinitiators, for example of the type of the substituted or unsubstituted acetophenones, anthraquinones, thioxanthones, benzoic esters or of the substituted or unsubstituted benzophenones. Particularly preferred examples are isopropylthioxanthone, benzophenone, phenyl benzyl ketone, 4-methylbenzophenone, halomethylated benzophenones, anthrone, 4,4'-bis-N,N-diethylaminobenzophenone, 4-chlorobenzophenone, 4,4'-dichlorobenzophenone, anthraquinone.

In one embodiment of the present invention, sufficient photoinitiator (E) is added to aqueous dispersions according to the present invention that the weight ratio of polyurethane (A) to photoinitiator (E) is in a range from 2:1 to 5000:1, preferably from 3:1 to 1000:1 and most preferably in a weight ratio from 5:1 to 500:1.

The efficacy of photoinitiators (E) in aqueous dispersions according to the present invention can if desired be enhanced by the addition of at least one synergist, for example of at least one amine, especially of at least one tertiary amine. Useful amines include for example triethylamine, N,N-dimethylethanolamine, N-methylethanolamine, triethanolamine, amino acrylates such as for example aminemodified polyether acrylates. When amines such as for example tertiary amines have been used as a catalyst in the synthesis of polyurethane (A) and have not been removed after synthesis, it is also possible for tertiary amine used as a catalyst to act as a synergist. Up to twice the molar amount of synergist can be added, based on photoinitiator (E) used.

Furthermore, tertiary amine used to neutralize acidic groups in polyurethane (A) such as for example COOH groups or $SO_3H$ groups can act as a synergist.

As customary organic amines there may be mentioned by way of example: triethylamine, 1,4-diazabicyclo[2,2,2]octane, tributylamine, dimethylbenzylamine, N,N,N',N'-tetramethylethylene-diamine, N,N,N',N'-tetramethylbutane-1,4-diamine, N,N,N',N'-tetramethylhexane-1,6-diamine, dimethylcyclohexylamine, dimethyldodecylamine, pentamethyldipropylenetriamine, pentamethyl-diethylenetriamine, 3-methyl-6-dimethylamino-3-azapentol, dimethylaminopropylamine, 1,3-bis-dimethylaminobutane, bis(2-dimethylaminoethyl) ether, N-ethylmorpholine, N-methylmorpholine, N-cyclohexylmorpholine, 2-dimethylaminoethoxyethanol, dimethylethanolamine, methyldiethanolamine, tetramethylhexamethylenediamine, dimethylamino-N-methylethanolamine, N-methyl-imidazole, N-formyl-N,N'-dimethylbutylenediamine, N-dimethylaminoethylmorpholine, 3,3'-bis-dimethylamino-di-n-propylamine and/or 2,2'-dipiparazine diisopropyl ether, dimethylpiparazine, tris(N,N-dimethylaminopropyl)-s-hexahydrotriazine, imidazoles such as 1,2-dimethylimidazole, 4-chloro-2,5-dimethyl-1-(N-methylaminoethyl)imidazole, 2-aminopropyl-4,5-dimethoxy-1-methyl-imidazole, 1-aminopropyl-2,4,5-tributylimidazole, 1-aminoethyl-4-hexylimidazole, 1-aminobutyl-2,5-dimethylimidazole, 1-(3-aminopropyl)-2-ethyl-4-methylimidazole, 1-(3-aminopropyl)imidazole and/or 1-(3-aminopropyl)-2-methylimidazole.

Preferred organic amines are trialkylamines having independently two $C_1$- to $C_4$-alkyl radicals and one alkyl or cycloalkyl radical having 4 to 20 carbon atoms, for example dimethyl-$C_4$-$C_{15}$-alkylamine such as dimethyldodecylamine or dimethyl-$C_3$-$C_8$-cycloalkylamine. Likewise preferred organic amines are bicyclic amines which may optionally comprise a further heteroatom such as oxygen or nitrogen such as for example 1,4-diazabicyclo[2,2,2]octane.

In a preferred embodiment at least one tertiary amine bearing at least one hydroxy group is used for neutralizing acidic groups in polyurethane (A), preferably N,N-dimethylethanolamine, N,N-diethylethanolamine, N-methyldiethanolamine, triethanolamine, tripropanolamine or 2-hydroxyethyl morpholine.

For neutralization of acidic groups in polyurethane (A) in a preferred embodiment an alkali metal hydroxide can be used, preferably sodium hydroxide or potassium hydroxide, very preferably sodium hydroxide.

Preferably 20 to 100, very preferably 50 to 100 mol % of the acidic groups in polyurethane (A) are neutralized by alkali metal hydroxide or tertiary amines, very preferably by alkali metal hydroxide or tertiary amines bearing at least one hydroxy group, especially preferably by alkali metal hydroxides.

Dispersions according to the present invention may be additized with one or more further compounds having C═C double bonds (F), hereinafter also referred to as unsaturated compounds (F).

In the simplest case, further styrene-acrylate resins or polyurethanes, optionally comprising double bonds are added to the aqueous dispersions.

Particularly suitable unsaturated compounds (F) include for example compounds of the general formula I. Further particularly suitable unsaturated compounds (F) are those of the general formula F.1 where

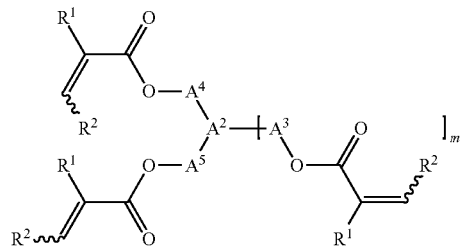

F.1

$R^1$ and $R^2$ are the same or different and are independently selected from hydrogen and $C_1$-$C_{10}$-alkyl, m is an integer from 0 to 2 and preferably 1;

$A^2$ is $CH_2$ or —$CH_2$—$CH_2$— or $R^8$—CH or para-$C_6H_4$ when m=0, CH, C—OH, C—O—C(O)—CH═$CH_2$, C—O—CO—C($CH_3$)═$CH_2$, $R^8$—C or 1,3,5-$C_6H_3$ when m=1, and carbon when m=2;

$R^8$ is selected from $C_1$-$C_4$-alkyl, such as for example n-$C_4H_9$, n-$C_3H_7$, iso-$C_3H_7$ and preferably $C_2H_5$ and $CH_3$, or phenyl, $A^3$, $A^4$ and $A^5$ are the same or different and are each selected from $C_1$-$C_{20}$-alkylene, such as for example —$CH_2$—, —$CH(CH_3)$—, —$CH(C_2H_5)$—, —$CH(C_6H_5)$—, —$(CH_2)_2$—, —$(CH_2)_3$—, —$(CH_2)_4$—, —$(CH_2)_5$—, —$(CH_2)_6$—, —$(CH_2)_7$—, —$(CH_2)_8$—, —$(CH_2)_9$—, —$(CH_2)_{10}$—, —$CH(CH_3)$—$(CH_2)_2$—$CH(CH_3)$—;

cis- or trans-$C_4$-$C_{10}$-cycloalkylene, such as for example cis-1,3-cyclopentylidene, trans-1,3-cyclopentylidene cis-1,4-cyclohexylidene, trans-1,4-cyclohexylidene;

$C_1$-$C_{20}$-alkylene, in each of which from one up to seven carbon atoms which are each nonadjacent are replaced by oxygen, such as for example —$CH_2$—O—$CH_2$—, —$(CH_2)_2$—O—$CH_2$—, —$(CH_2)_2$—O—$(CH_2)_2$—, —[$(CH_2)_2$—O]$_2$—$(CH_2)_2$—, —[$(CH_2)_2$—O]$_3$—$(CH_2)_2$—;

$C_1$-$C_{20}$-alkylene which is substituted by up to 4 hydroxyl groups, and in which from one up to seven carbon atoms which are each nonadjacent are replaced by oxygen, such as for example —$CH_2$—O—$CH_2$—CH(OH)—$CH_2$—, —$CH_2$—O—[$CH_2$—CH(OH)—$CH_2$]$_2$—, —$CH_2$—O—[$CH_2$—CH(OH)—$CH_2$]$_3$—;

$C_6$-$C_{14}$-arylene, such as for example para-$C_6H_4$.

Particularly preferred examples of compounds of the general formula F.I are trimethylolpropane tri(meth)acrylate, tri(meth)acrylate of triply ethoxylated trimethylolpropane, pentaerythritol tri(meth)acrylate and pentaerythritol tetra(meth)acrylate. Preferred are those amongst the compounds listed which are at least partially water-miscible.

In a preferred embodiment these compounds exhibit a log P(ow) partitioning coefficient in n-octanol/water lower than 3, preferably lower than 2 and very preferably lower than 1.

Preferably calculation of the log P values takes place with the program ACD/PhysChem Suite, Version 12.01 from Advanced Chemistry Development, Inc. (ACD/Labs, Ontario, Canada).

Further very useful representatives of unsaturated compounds (F) are ethylene glycol di(meth)acrylate, diethylene glycol di(meth)acrylate, triethylene glycol di(meth)acrylate, propylene glycol (meth)acrylate, dipropylene glycol di(meth)acrylate and tripropylene glycol di(meth)acrylate.

Further preferred unsaturated compounds (F) are reaction products of (meth)acrylic acid with diglycidyl ethers, preferably aromatic or aliphatic diglycidyl ethers, very preferably reaction products of acrylic acid with bisphenol-A-diglycidyl ether, ethylene glycol diglycidyl ether, neopentylene glycol diglycidyl ether, butane-1,4-diol diglycidyl ether, hexane-1,6-diol diglycidyl ether, poly(tetrahydrofuran) diglycidyl ether or cyclohexane-1,4-dimethanol diglycidyl ether.

Further very useful representatives of unsaturated compounds (F) are partially or exhaustively (meth)acrylated polyols such as for example partially or exhaustively (meth) acrylated dimeric trimethylolpropane, partially or exhaustively (meth)acrylated dimeric trimethylolethane, partially or exhaustively (meth)acrylated dimeric pentaerythritol.

For example, a total of up to 100% by weight, based on the sum total of (A) and (B), of unsaturated compound (F) can be added, preferably up to 50% by weight and more preferably up to 25% by weight.

Aqueous dispersions according to the present invention are very useful as or for producing formulations for flexographic, gravure or ink-jet printing.

Useful Substrate Materials Include:
cellulosic materials such as paper, board, card, wood and woodbase, which may each be lacquered or otherwise coated,
metallic materials such as foils, sheets or workpieces composed of aluminum, iron, copper, silver, gold, zinc or alloys thereof, which may each be lacquered or otherwise coated, silicatic materials such as glass, porcelain and ceramic, which may each be coated, polymeric materials of any kind such as polystyrene, polyamides, polyesters, polyethylene, polypropylene, melamine resins, polyacrylates, polyacrylonitrile, polyurethanes, polycarbonates, polyvinyl chloride, polyvinyl alcohols, polyvinyl acetates, polyvinylpyrrolidones and corresponding copolymers including block copolymers, biodegradable polymers, e.g. polylactic acid, and natural polymers such as gelatin,
leather—both natural and artificial—in the form of smooth leather, nappa leather or suede leather.

The substrates may optionally be in a pretreated and/or precoated state in that, for example, sheets or films can be corona or plasma discharge treated, flame treated or precoated with a primer before application.

Plastics particularly worth highlighting include polycarbonate, polyethylene, for example PE, HDPE, LDPE, polypropylene, for example PP, oriented PP (OPP), biaxially oriented PP (BOPP), polyamide, for example Nylon®, and polyethylene terephthalate (PET) or PVC.

Preferred substrates are paper, including in particular paper, paperboard, cardboard, polyester sheets or films, polyethylene sheets or films and polypropylene sheets or films and also glass. Sheets or films may optionally also be metalized.

Printing inks according to the present invention for printing processes may comprise further admixtures (G) of the kind which are customary especially for aqueous printing inks and in the printing and coatings industries. Examples include preservatives such as for example 1,2-benzisothiazolin-3-one (commercially available as Proxel brands from Avecia Lim.) and its alkali metal salts, glutaraldehyde and/or tetramethylolacetylenediurea, Protectols®, antioxidants, degassers/defoamers such as for example acetylenediols and ethoxylated acetylenediols, which typically comprise from 20 to 40 mol of ethylene oxide per mole of acetylenediol and may at the same time also have a dispersing effect, viscosity regulators, flow agents, wetters (for example wetting surfactants based on ethoxylated or propoxylated fatty or oxo alcohols, propylene oxide-ethylene oxide block copolymers, ethoxylates of oleic acid or alkylphenols, alkylphenol ether sulfates, alkylpolyglycosides, alkyl phosphonates, alkylphenyl phosphonates, alkyl phosphates, alkylphenyl phosphates or preferably polyethersiloxane copolymers, especially alkoxylated 2-(3-hydroxypropyl)heptamethyltrisiloxanes, which generally comprise a block of 7 to 20 and preferably 7 to 12 ethylene oxide units and a block of 2 to 20 and preferably 2 to 10 propylene oxide units and may be comprised in the colorant preparations in amounts from 0.05% to 1% by weight), anti-settlers, luster improvers, glidants, adhesion improvers, anti-skinning agents, delusterants, emulsifiers, stabilizers, hydrophobicizers, light control additives, slip aids, waxes, rheology improvers, adhesion promoters antistats, bases such as for example triethanolamine or acids to regulate the pH. When these agents are a constituent part of present invention printing inks for printing processes, their total amount will generally be 2% by weight and especially 1% by weight, based on the weight of the present invention's colorant preparations and especially of the present invention printing inks for printing processes.

To adjust the viscosity, it may be necessary to add a thickener to the printing ink to adjust the viscosity.

The printing inks and lacquers of the present invention may optionally comprise further additives and auxiliary materials. Examples of additives and auxiliary materials are fillers such as calcium carbonate, aluminum oxide hydrate or aluminum silicate or magnesium silicate. Waxes enhance the abrasion resistance and serve to enhance glideability.

Examples are, in particular, polyethylene waxes, oxidized polyethylene waxes, petroleum waxes or ceresin waxes. Fatty acid amides can be used to enhance surface smoothness.

Plasticizers serve to enhance the elasticity of the dried film. Examples are phthalic esters such as dibutyl phthalate, diisobutyl phthalate, dioctyl phthalate, citric esters or esters of adipic acid. Dispersant auxiliaries can be used to disperse the pigments. In the case of the fluid printing inks and printing lacquers of the present invention, it is advantageously possible to omit adhesion promoters without thereby foreclosing the use of adhesion promoters. The total amount of all additives and auxiliary materials typically does not exceed 20% by weight, based on the sum total of all constituents, and is preferably in the range from 0% to 10% by weight.

Present invention printing inks for printing processes may further comprise a further photoinitiator other than the photoinitiator (E) which can be used in the preparation of aqueous dispersion according to the present invention, but is selected from the photoinitiators recited above. Present invention printing inks for printing processes in one embodiment of the present invention have a dynamic viscosity in the range from 3 to 2000 mPa·s, preferably from 5 to 1000 mPa·s, and more preferably from 10 to 500 mPas·s and most preferably from 10 to 150 mPa·s, measured at 23° C. in accordance with German standard specification DIN 53018.

In the case of ink jet inks the viscosity is usually from 1 to 100 mPas, preferably from 2 to 50 and more preferably from 3 to 15 mPas.

In the case of flexographic or gravure inks the viscosity is usually from 10 to 2000 mPas, preferably from 30 to 150 mPas.

The surface tension of present invention printing inks for printing processes in one embodiment of the present invention is in the range from 25 to 70 mN/m and especially in the range from 30 to 60 mN/m, measured at 25° C. in accordance with German standard specification DIN 53993.

The pH of present invention printing inks for printing processes in one embodiment of the present invention is in the range from 5 to 10 and preferably in the range from 7 to 10.

Present invention printing inks for printing processes have altogether advantageous performance characteristics, good drying performance, and produce printed images of high quality, i.e., of high gloss, brilliance and depth of shade and also high dry rub, light, water and wet rub fastness as well as good heat-seal resistance. They are particularly useful for printing coated and plain paper, paperboard, and also cardboard and PE/PP/PET sheets or films and glass. It is a particular advantage of the printing inks of the present invention that their residues on printing rollers and printing plates, whether from a preceding printing operation or else have dried after interruption of the printing operation can be easily redissolved by fresh ink. Such improved re-dissolving is particularly advantageous for the flexographic process but not just there. A further aspect of the present invention is a process for producing present invention printing inks for printing processes. The present invention's process for producing printing inks for printing processes comprises mixing at least one aqueous dispersion according to the present invention, optionally at least one pigment (B), water and optionally at least one admixture (G) with one another, for example in one or more steps.

The water content of the printing inks, preferably flexographic printing inks according to the invention may be at least 5% by weight, preferably at least 10%, very preferably at least 35%, more preferably at least 40% and especially at least 50% by weight.

Useful mixing techniques include for example stirring and intensive shaking and also dispersing, for example in ball mills or stirred ball mills.

The order of addition when mixing aqueous dispersion according to the present invention, water, optionally (C), optionally (D), optionally (E), optionally (F) and optionally (G) is as such not critical.

It is accordingly possible, in one preferred version of the present invention, first for at least one polyurethane (A) to be synthesized, then dispersed with pigment (B) or a pigment preparation and thereafter mixed with one or more of the desired additives additional (A), (C), (D), (E), (F) and/or (G) and, before or after the mixing, thinned with water.

It is possible, in one version of the present invention, first for at least one polyurethane (A) to be synthesized, then dispersed with pigment (B) and thereafter mixed with one or more of the desired additives (C), (D), (E), (F) and/or (G) and, before or after the mixing, thinned with water.

In another version of the present invention, (a) at least one polyurethane (A) and optionally at least one styrene-acrylate resin or polyurethane (D) are synthesized, then mixed with polymerization inhibitor (C) and dispersed with (B), thinned with water and mixed optionally with one or more of the desired additives (E), (F) and/or (G).

It is possible, in a further very preferred version, first for at least one styrene-acrylate copolymer (D) to be synthesized, then dispersed with pigment (B) and thereafter mixed with at least one polyurethane (A) and also optionally with one or more of the desired additives (C), (D), (E) and/or (F) and, before or after the mixing, thinned with water.

A further aspect of the present invention is a process for printing sheetlike or filmlike or three-dimensional, preferably sheetlike or filmlike, substrates by a printing process other than an ink jet process using at least one printing ink according to the present invention. A preferred version of the inventive printing process comprises printing at least one printing ink of the present invention onto a substrate and then treating with actinic radiation.

Printing processes in which the printing inks of the present invention can be used are preferably ink jet printing, flexographic printing, and gravure printing, more preferably flexographic printing and gravure printing, and very preferably flexographic printing.

In a preferred embodiment of the present invention, flexographic printing can be effected for example by printing the optionally pretreated substrate to be coated with differently pigmented printing inks of the present invention in succession at individual printing stations. Between the individual printing stations it is preferable for an at least partial drying and more preferably complete drying to take place. "Complete drying" means a surface which is dry to the touch.

Partial drying preferably increases the viscosity of the ink layer printed to the substrate through evaporation of at least some of the diluent from the ink layer to a viscosity higher than a viscosity of a second ink which is applied over said first ink layer in a subsequent printing station spaced from the first printing station, to a viscosity which is sufficient to render said second liquid ink applicable over the first ink layer as said substrate is transported between said printing stations. This increase in the viscosity is accomplished by the use of fugitive solvents in the printing inks.

Hence, in such a process the ink layer deposited or applied at each printing station is not dried before the next ink layer is deposited thereover to produce a coloristic or visual effect.

The individual printing stations plus drying stations are preferably disposed around a central roll, but it is also possible to transport the substrate in each individual printing station via direction-changers over one roll in each case.

In a very preferred embodiment of the present invention printing, preferably flexographic printing can be effected by
a) printing the optionally pretreated substrate with a first pigmented printing ink in a first printing station,
b) followed by at least partially, preferably completely drying the thus obtained printing layer,
c) optionally repeating the steps a) and b) with differently pigmented printing inks,
d) followed by finally curing the thus obtained printing layer or printing layers with the help of electron beam or actinic radiation.

In step d) electron beam curing takes place in case the printing inks do not comprise any photoinitiator.

In step d) curing by actinic radiation takes place in case the printing inks comprise at least one photoinitiator.

Preferably step c) is repeated one to ten times.

The final printed image after passage through all printing stations is dried and electron beam or UV-cured to completion.

A preferred flexographic printing process is described in WO 03/070464 A1, preferably page 4, line 26 to page 19, line 13, which is hereby incorporated by reference.

It is also possible that the final printed image after passage through all printing stations is dried, stored, e.g. on the roll or in a stack, and subjected to electron beam or UV-curing after storage.

The dry layer thickness in which the printing inks of the present invention are applied to the substrate differs with each printing method and can typically be up to 20 μm, preferably in the range from 0.1 to 8 μm, more preferably in the range from 0.2 to 7 μm, even more preferably in the range from 1 to 5 μm and particularly in the range from 1 to 4 μm. Typical printing ink layer thicknesses are 1 to 8 μm for flexographic printing, 1-4 μm for offset printing, 1-12 μm for gravure printing.

Present invention printing inks for printing processes are curable by actinic radiation. Actinic radiation having a wavelength range from 200 nm to 700 nm is useful for example. Actinic radiation having an energy in the range from 30 mJ/cm$^2$ to 2000 mJ/cm$^2$ is useful for example. Actinic radiation may advantageously be applied continuously or in the form of flashes for example.

A preferred embodiment of the present invention comprises effecting the curing of the printing inks by means of electron radiation in suitable electron flash devices, for example at an energy in the range from 50 to 300 keV, preferably from 90 to 200 keV. One advantage of performing the curing by means of electron radiation is that the printing inks thus cured are generally more resistant to rubbing than printing inks cured with UV light.

When curing is effected by means of electron radiation, the printing ink of the present invention preferably does not comprise any photoinitiator (E). This has the advantage that no migratable photoinitiator constituents remain in the coating which have been formed by irradiation. This is particularly of advantage when the coatings are intended for food contact.

The distance of the electron flash devices to the printing surface is between 1 and 100 cm, preferably 2 to 50 cm.

It will be appreciated that it is also possible to use two or more sources of radiation for the curing in order to achieve the radiation dose required for optimum curing.

In one embodiment of the present invention, the substrate materials after printing and before treatment with actinic radiation can be interdried, for example thermally or with IR radiation. Examples of suitable conditions are temperatures ranging depending on the substrate from 30 to 120° C. for a period from 1 second to 24 hours, preferably from one up to 1 min, more preferably up to 30 sec. Useful IR radiation includes for example IR radiation in a wave region above 800 nm. Useful interdrying apparatuses include for example drying cabinets including vacuum drying cabinets for thermal interdrying, and also IR lamps.

Similarly, the heat evolved upon application of actinic radiation can have an interdrying effect.

Invention printing inks and prints obtained using invention printing inks, however, are also curable thermally, with or without the action of actinic radiation. For instance, prints obtained using invention printing inks are fixable by drying at 25 to 150° C., preferably 40 to 120° C., more preferably 60 to 90° C.

In one preferred embodiment, the irradiating can also be carried out under exclusion of oxygen or oxygen-depleted atmosphere, for example at an oxygen partial pressure of less than 18 kPa, preferably less than 5 kPa, more preferably less than 1 kPa, even more preferably less than 1000 ppm oxygen and particularly less than 500 ppm oxygen, or under inert gas atmosphere. Useful inert gases are preferably nitrogen, noble gases, carbon dioxide, water vapor or combustion gases. The oxygen partial pressure can also be reduced by lowering the ambient pressure.

One preferred embodiment of the present invention comprises a first step of dispersing at least one present invention polyurethane (A) and at least one pigment (B) to form initially a pigment concentrate which in a second step is then mixed by addition of a styrene-acrylate copolymer, as described under (G), as non-radiation-curable binder to form a simple printing ink. This can then be mixed in a third step by addition of the components (C), (D), (F) and/or (G) to form the actual printing ink which in a fourth step is applied to the desired substrate and in a fifth step is electron beam cured.

It is also possible, in a first step, by dispersing at least one styrene-acrylate copolymer as described under (G) and at least one pigment (B) to initially produce a pigment concentrate which in a second step is then mixed to form a simple printing ink by addition of at least one polyurethane (A) of the present invention. This simple printing ink can then be mixed in a third step, by addition of the components (C), (D), (F) and/or (G), to form the actual printing ink which in a fourth step is applied to the desired substrate and in a fifth step is electron beam cured.

In a further embodiment of the present invention, two or more and preferably three or more different present invention printing inks for printing processes can be combined into sets, in which case different printing inks according to the present invention each comprise different pigments each having a different color.

A process for producing at least partially enveloped pigments according to the present invention is described above and likewise forms part of the subject matter of the present invention.

At least partially enveloped pigments according to the present invention are winnable for example from aqueous dispersions according to the present invention by removing the water, for example by drying, freeze drying, filtration or a combination thereof.

At least partially enveloped pigments according to the present invention are particularly useful for producing printing inks for printing processes.

The present invention further provides polyurethanes (A) prepared by reaction of
(a) 15% to 70% by weight, preferably 30% to 60% by weight, of di- or polyisocyanate comprising on average from 1 to 10 allophanate groups and on average from 1 to 10 C—C double bonds per molecule, and
(b) optionally 0 to 60% by weight, preferably to 20% by weight, of further di- or polyisocyanate,
(c) 5% to 50% by weight of compounds having at least one isocyanate-reactive group, comprising at least one polycarbonate diol with a molecular weight from 500 to 3000 g/mol, and optionally
(d) at least one compound of the general formula I.

Weight % ages are all based on total polyurethane (A) of the present invention.

In a preferred embodiment of the present invention the polyurethane (A) exhibits a double bond density of at least 0.5 mol/kg, preferably of at least 0.7 mol/kg, more preferably at least 1 mol/kg, very preferably at least 1.2 mol/kg and especially preferably at least 1.5 mol/kg. Usually the double bond density does not exceed 5 mol/kg, preferably it is less than 3 mol/kg.

The double bond density is determinable for example by determination of the hydrogenation iodine number and by $^1$H NMR spectroscopy.

To improve the durability of polyurethane (A) of the present invention, it is admixed with at least one polymerization inhibitor (C) during or immediately after synthesis.

A process for producing polyurethanes (A) according to the present invention is described above and likewise forms part of the subject matter of the present invention.

Polyurethanes (A) according to the present invention are particularly useful for producing printing inks according to the present invention and for producing aqueous dispersions according to the present invention.

The invention is illustrated by working examples.

General Preliminaries:

The NCO content was in each case monitored titrimetrically in accordance with German standard specification DIN 53185.

The degree of envelopment of pigments according to the present invention was determined by transmission electron microscopy using the freeze fracture technique.

Solids content: % ages in the realm of the present invention are all % by weight. Solids contents in the realm of the present invention are all determined by drying at 150° C. for 30 minutes. Dynamic viscosity was in each case determined at room temperature.

Comparative Example 1

In a reaction vessel equipped with a mechanical stirrer were given 48 parts of a dihydroxy functional aliphatic polyester Lupraphen® 8007, 11 parts neopentylglycole, 35 parts nimethylolpropionic acid, 0.4 parts 2,6 Di-t-butyl-p-Kresol, 0.2 parts 4-Methoxyphenol, 238 parts of a polyisocyanate of formula (Ia) Laromer® LR 9000 (commercially available from BASF SE, Ludwigshafen), 18 parts hexamethylene diisocyanate, 0.4 parts BorchiKat®24 (Bismuth carboxylate, available from OMG Borchers GmbH, Langenfeld, Germany) and 350 parts acetone. The reaction mixture was homogenized and heated up to 80° C. The reaction was carried out for 8 hrs at 80° C. and was stopped by adding 22 parts diethanol amine in 22 parts acetone at a residual prepolymer NCO content of 1.23%. The reaction was stirred during 20 min at 80° C. For the duration of 10 min were given 26 parts triethylamine in 26 parts Acetone to the reaction mixture. During additional 30 min were given 850 parts deionized water to the polymeric solution and subsequently the acetone was stripped off under vacuum during 1.5 hrs. The viscosity of the translucent dispersion was determined to be 745 mPa s at a given solids content of 35.1% by weight.

Comparative Example 2

In a reaction vessel equipped with a mechanical stirrer were given 75 parts of a dihydroxy functional partially cycloaliphatic polyester Lupraphen® VP 9327, 10 parts neopentylglycole, 32 parts dimethylolpropionic acid, 0.3 parts 2,6 Di-t-butyl-p-Kresol, 0.2 parts 4-methoxyphenol, 217 parts of a polyisocyanate of formula (Ia) Laromer® LR 9000 (commercially available from BASF SE, Ludwigshafen), 16 parts hexamethylene diisocyanate, 0.4 parts BorchiKat®24 (Bismuth carboxylate, available from OMG Borchers GmbH, Langenfeld, Germany) and 350 parts acetone. The reaction mixture was homogenized and heated up to 80° C. The reaction was carried out for 8 hrs at 80° C. and was stopped by adding 20 parts diethanol amine in 20 parts acetone at a residual prepolymer NCO content of 1.12%. The reaction was stirred during 20 min at 80° C. For the duration of 10 min were given 24 parts triethylamine in 24 parts acetone to the reaction mixture. During additional 30 min were given 850 parts deionized water to the polymeric solution and subsequently the acetone was stripped off under vacuum during 1.5 hrs. The viscosity of the translucent dispersion was determined to be 175 mPa s at a given solids content of 31.8% by weight.

Comparative Example 3

In a reaction vessel equipped with a mechanical stirrer were given 108 parts of a dihydroxy functional partially aromatic polyester Lupraphen® VP 9184, 16 parts cyclohexane dimethanol, 40 parts dimethylolpropionic acid, 0.4 parts 2,6 Di-t-butyl-p-Kresol, 0.2 parts 4-methoxyphenol, 265 parts of a polyisocyanate of formula (Ia) Laromer® LR 9000 (commercially available from BASF SE, Ludwigshafen), 20 parts hexamethylene diisocyanate, 0.5 parts BorchiKat®24 (Bismuth carboxylate, available from OMG Borchers GmbH, Langenfeld, Germany) and 450 parts acetone. The reaction mixture was homogenized and heated up to 80° C. The reaction was carried out for 8 hrs at 80° C. and was stopped by adding 25 parts Diethanol amine in 30 parts Acetone at a residual prepolymer NCO content of 1.11%. The reaction was stirred during 20 min at 80° C. For the duration of 10 min were given 30 parts Triethylamine in 30 parts Acetone to the reaction mixture. During additional 30 min were given 1000 parts deionized water to the polymeric solution and subsequently the acetone was stripped off under vacuum during 1.5 hrs. The viscosity of the translucent dispersion was determined to be 375 mPa s at a given solids content of 35.7% by weight.

EXAMPLES ACCORDING TO THE INVENTION

Example 1

In a reaction vessel equipped with a mechanical stirrer were given 109 parts of a dihydroxy functional aliphatic polycarbonate Oxymer® M112 from Perstorp, 12 parts neopentylglycole, 39 parts dimethylolpropionic acid, 0.4 parts 2,6 Di-t-butyl-p-Kresol, 0.2 parts 4-methoxyphenol, 268 parts of a polyisocyanate of formula (Ia) Laromer® LR 9000 (commercially available from BASF SE, Ludwigshafen), 20 parts hexamethylene diisocyanate, 0.5 parts BorchiKat®24 (Bismuth carboxylate, available from OMG Borchers GmbH, Langenfeld, Germany) and 450 parts acetone. The reaction mixture was homogenized and heated up to 80° C. The reaction was carried out for 8 hrs at 80° C. and was stopped by adding 27 parts diethanol amine in 30 parts acetone at a residual prepolymer NCO content of 1.18%. The reaction was stirred during 20 min at 80° C. For the duration of 10 min were given 30 parts triethylamine in 30 parts acetone to the reaction mixture. During additional 30 min were added 1000 parts deionized water to the polymeric solution and subsequently the acetone was stripped off under vacuum during 1.5 hrs. The viscosity of the translucent dispersion was determined to be 800 mPa s at a given solids content of 29.1% by weight.

Example 2

In a reaction vessel equipped with a mechanical stirrer were given 104 parts of a dihydroxy functional aliphatic polycarbonate Oxymer® M112 from Perstorp, 9 parts neopentylglycole, 40 parts dimethylolpropionic acid, 8 parts Laromer® LR 8765 (epoxy acrylate based on 1,4-Butanediylbis[oxy(2-hydroxy-3,1-propanediyl)]diacrylate, commercially available from BASF SE, Ludwigshafen), 0.4 parts 2,6 Di-t-butyl-p-Kresol, 0.2 parts 4-methoxyphenol, 268 parts of a polyisocyanate Laromer® LR 9000 (commercially available from BASF SE, Ludwigshafen), 20 parts hexamethylene diisocyanate, 0.5 parts BorchiKat®24 (Bismuth carboxylate, available from OMG Borchers GmbH, Langenfeld, Germany) and 450 parts acetone. The reaction mixture was homogenized and heated up to 80° C. The reaction was carried out for 8 hrs at 80° C. and was stopped by adding 27 parts diethanol amine in 30 parts acetone at a residual prepolymer NCO content of 1.24%. The reaction was stirred during 20 min at 80° C. For the duration of 10 min were given 30 parts triethylamine in 30 parts acetone to the reaction mixture. During additional 30 min were added 1000 parts deionized water to the polymeric solution and subsequently the acetone was stripped off under vacuum during 1.5 hrs. The viscosity of the translucent dispersion was determined to be 260 mPa s at a given solids content of 31.8% by weight.

Example 7

In a reaction vessel equipped with a mechanical stirrer were given 150 parts of a dihydroxy functional aliphatic polycarbonate Ravecarb® 107 from Enichem, 9 parts neopentylglycole, 40 parts dimethylolpropionic acid, 0.4 parts 2,6 Di-t-butyl-p-Kresol, 0.2 parts 4-methoxyphenol, 233 parts of a polyisocyanate of formula (Ia) Laromer® LR 9000 (commercially available from BASF SE, Ludwigshafen), 17 parts hexamethylene diisocyanate, 0.5 parts BorchiKat®24 (Bismuth carboxylate, available from OMG Borchers GmbH, Langenfeld, Germany) and 450 parts acetone. The reaction mixture was homogenized and heated up to 80° C. The reaction was carried out for 8 hrs at 80° C. and was stopped by adding 25 parts diethanol amine in 30 parts Acetone at a residual prepolymer NCO content of 1.13%. The reaction was stirred during 20 min at 80° C. For the duration of 10 min were given 30 parts Triethylamine in 30 parts Acetone to the reaction mixture. During additional 30 min were added 800 parts deionized water to the polymeric solution and subsequently the acetone was stripped off under vacuum during 1.5 hrs. The viscosity of the translucent dispersion was determined to be 1070 mPa s at a given solids content of 42.2% by weight.

Example 3

In a reaction vessel equipped with a mechanical stirrer were given 138 parts of a dihydroxy functional aliphatic Polycarbonate PM2000 from UBE, 7 parts neopentylglycole, 40 parts dimethylolpropionic acid, 7 parts Laromer® LR 8765 (epoxy acrylate based on 1,4-Butanediyl-bis[oxy(2-hydroxy-3,1-propanediyl)]diacrylate, commercially available from BASF SE, Ludwigshafen), 0.4 parts 2,6 Di-t-butyl-p-Kresol, 0.2 parts 4-Methoxyphenol, 239 parts of a polyisocyanate of formula (Ia) Laromer® LR 9000 (commercially available from BASF SE, Ludwigshafen), 18 parts hexamethylene diisocyanate, 0.5 parts BorchiKat®24 (Bismuth carboxylate, available from OMG Borchers GmbH, Langenfeld, Germany) and 450 parts acetone. The reaction mixture was homogenized and heated up to 80° C. The reaction was carried out for 8 hrs at 80° C. and was stopped by adding 16 parts monoethanol amine in 30 parts acetone at a residual pre-polymer NCO content of 1.20%. The reaction was stirred during 20 min at 80° C. For the duration of 10 min were given 30 parts Triethylamine in 30 parts acetone to the reaction mixture. During additional 30 min were added 900 parts deionized water to the polymeric solution and subsequently the acetone was stripped off under vacuum during 1.5 hrs. The viscosity of the translucent dispersion was determined to be 980 mPa s at a given solids content of 37.1% by weight.

Example 4

In a reaction vessel equipped with a mechanical stirrer were given 74 parts of a dihydroxy functional aliphatic polycarbonate Oxymer® M112 from Perstorp, 7 parts neopentylglycole, 32 parts dimethylolpropionic acid, 5 parts Laromer® LR 8765 (epoxy acrylate based on 1,4-Butanediyl-bis[oxy(2-hydroxy-3,1-propanediyl)]diacrylate, commercially available from BASF SE, Ludwigshafen), 13 parts 2-hydroxyethyl acrylate, 0.4 parts 2,6 Di-t-butyl-p-Kresol, 0.2 parts 4-methoxyphenol, 203 parts of a polyisocyanate of formula (Ia) Laromer® LR 9000 (commercially available from BASF SE, Ludwigshafen), 15 parts hexamethylene diisocyanate, 0.5 parts BorchiKat®24 (Bismuth carboxylate, available from OMG Borchers GmbH, Langenfeld, Germany) and 350 parts acetone. The reaction mixture was homogenized and heated up to 80° C. The reaction was carried out for 8 hrs at 80° C. and was stopped by adding 17 parts Diethanol amine in 30 parts acetone at a residual prepolymer NCO content of 0.97%. The reaction was stirred during 20 min at 80° C. For the duration of 10 min were given 24 parts triethylamine in 30 parts acetone to the reaction mixture. During additional 30 min were added 700 parts deionized water to the polymeric solution and subsequently the acetone was stripped off under vacuum during 1.5 hrs. The viscosity of the translucent dispersion was determined to be 6540 mPa s at a given solids content of 38.5% by weight.

Example 5

In a reaction vessel equipped with a mechanical stirrer were given 104 parts of a dihydroxy functional aliphatic polycarbonate Oxymer® M112 from Perstorp, 9 parts neopentylglycole, 44 parts dimethylolpropionic acid, 7 parts Laromer® LR 8765 (epoxy acrylate based on 1,4-Butanediylbis[oxy(2-hydroxy-3,1-propanediyl)]diacrylate, commercially available from BASF SE, Ludwigshafen), 19 parts 2-hydroxyethyl acrylate, 0.5 parts 2,6 Di-t-butyl-p-Kresol, 0.2 parts 4-methoxyphenol, 285 parts of a polyisocyanate of formula (Ia) Laromer® LR 9000 (commercially available from BASF SE, Ludwigshafen), 21 parts hexamethylene diisocyanate and 210 parts acetone. The reaction mixture was homogenized and heated up to 80° C. and was carried out for 6 hrs at 80° C. and finally was quenched by the addition of 9 parts monoethanol amine in 30 parts acetone at a residual prepolymer NCO content of 0.91%. The reaction was stirred during 20 min at 80° C. For the duration of 10 min were given 126 parts of a 10% by weight containing aqueous sodium hydroxide solution to the reaction mixture. During additional 30 min were added 750 parts deionized water to the polymeric solution and subsequently the acetone was stripped off under vacuum during 1.5 hrs. The viscosity of the translucent dispersion was determined to be 458 mPa s at a given solids content of 36.2% by weight.

A flexographic ink was made by blending 30% by weight of a pigment concentrate (42.5% Irgalith® GLO (BASF SE)/34.0% Joncryl® HPD96E (BASF SE)/23.0% Water/0.5% Foamex® 810 (Evonik)), 65% by weight of a polymer dispersion prepared in the Examples or Comparative Examples and 5% by weight of a wax emulsion (JONWAX®35, BASF SE).

This mixture was diluted using a blend of pigment concentrate/water=30/70 until a viscosity of 20 sec in a DIN 4 cup was reached.

The ink thus obtained was applied to LDPE, transparent LDPE and on transparent coes-OPP using a K-Bar 0 (4 micron wet) on the different films. Afterwards the print was dried in an oven at 60° C. for 30 sec.

After drying the prints were electron beam-cured with an EBeam Lab unit Navarone LA100 from COMET and an EB Dose of 25 kGy. Acceleration voltage was set to 60 kV, current 10.5 mA, feed rate 3 m/min.

The prints were tested as follows:

|  |  | Examples: | | | | |
| --- | --- | --- | --- | --- | --- | --- |
|  |  | E1 | E2 | E3 | E4 | E5 |
| Before EB | Tape adhesion (airdrying) [a] | 4 | 4-5 | 4-5 | 3 | 4 |
| Before EB | Tape adhesion (1 min, 60° C.) [b] | 5 | 5 | 4-5 | 3 | 4 |
| Before EB | Scratch resistance [c] | 3 | 2 | 3-4 | 3 | 3 |
| Before EB | Wrinkle (dry) [d] | 5 | 5 | 5 | 5 | 5 |
| Before EB | Blocking (5T/30° C./24 hrs) (R/D) [e] | 5/5 | 5/5 | 4-5/5 | 5/5 | 5/5 |
| Before EB | Drying speed [f] | slow | fast | ok | ok | ok |
| Before EB | Ink transfer (K-lox 400lpi) [g] | ++ | -- | -- | ok | ok |
| After EB | Tape adhesion (airdrying) | 5 | 5 | 5 | 5 | 5 |
| After EB | Scratch resistance | 2-3 | 4-5 | 3 | 4 | 4 |
| After EB | Wrinkle (wet) running tap [h] | 5 | 4 | 5 | 5 | 5 |
| After EB | HSR (160° C./400N/1 sec) (R/D) [i] | 4/4-5 | 3/3 | 5/5 | 5/5 | 5/5 |
| After EB | HSR (180° C./400N/1 sec) (R/D) [j] |  |  |  | 5/5 | 5/5 |
| After EB | Wet satra (2 h stored in water) [k] |  |  | 200/90 | 200/75 | 200/100 |

|  |  | Comparative | |
| --- | --- | --- | --- |
|  |  | CE1 | CE2 |
| Before EB | Tape adhesion (airdrying) [a] | 1-2 | 4 |
| Before EB | Tape adhesion (1 min, 60° C.) [b] | 1-2 | 4-5 |
| Before EB | Scratch resistance [c] | 3 | 3 |
| Before EB | Wrinkle (dry) [d] | 5 | 5 |
| Before EB | Blocking (5T/30° C./24 hrs) (R/D) [e] | 5/5 | 5/5 |
| Before EB | Drying speed [f] | slow | fast |
| Before EB | Ink transfer (K-lox 400lpi) [g] | ++ | ++ |
| After EB | Tape adhesion (airdrying) |  | 5 |
| After EB | Scratch resistance |  | 4 |
| After EB | Wrinkle wet running tap [h] |  | 4-5 |
| After EB | HSR (160° C./400N/1 sec) (R/D) [i] |  | 3/2 |
| After EB | HSR (180° C./400N/1 sec) (R/D) [j] |  |  |
| After EB | Wet satra (2 h stored in water) [k] |  |  |

EB: Electron Beam curing,
HSR: Heat Seal Resistance

[a] Tape adhesion, before oven. Pressure-sensitive adhesive tape is applied to an area of the coating. Adhesion is considered to be adequate if no coating is pulled off by the tape when it is removed.
[b] Tape adhesion, after 1 minute at 60° C. Pressure-sensitive adhesive tape is applied to an area of the coating. Adhesion is considered to be adequate if no coating is pulled off by the tape when it is removed.
[c] Scratch/Scuff resistance after 1 minute at 60° C. Explanation scratch: scratch 5x with the top of a fingernail over the foil. Explanation scuff: scuff 5x with a flat fingernail over the foil.
[d] Wrinkle (dry). Wrinkle 10 times the foil between the hands and observe on damage
[e] Blocking. Place on top of the dried draw-down another foil with the non treated side on the ink side. Place the draw-down in the laboratory press (Specac) for 24 hours at 30° C. and 5T pressure.
[f] Drying speed: Inks are applied side-by-side to OPP film, using K-bar 1 (6 μm wet). After application the (difference in) dryingspeed is judged by putting the fingertip to the printed surface and record time until "touch-dry".
[g] Ink transfer: Inks are applied side-by-side to OPP, using a K-lox anilox proofer (400lpi anilox). Difference in colourstrength between the different inks is judged and is a measure for inktransfer.
[h] Wrinkle (wet). Wrinkle 10 times the foil between the hands under a running water tap and observe on damage
[i] HSR (160° C.): The draw downs are put with the coated side to the mat side of aluminium foil. Than the aluminium foil is fold up. The "strokes" are placed on the crimp seal machine and heated two sides (160° C.) for 1 second with a pressure of 400N. The strokes are observed on damage and release.
[j] HSR (180° C.): The draw downs are put with the coated side to the mat side of aluminium foil. Than the aluminium foil is fold up. The "strokes" are placed on the crimp seal machine and heated two sides (180° C.) for 1 second with a pressure of 400N. The strokes are observed on damage and release.
[k] Wet Satra (2 hr stored in water): Printed material will be stored in water (20° C.) for 2 hours. Prints will be removed from the water and immediately tested for "wet rub resistance", using Satra rub tester. Prints will be tested up to 200rubs. After 200 rubs, the amount of inkremoval will be judged and recorded.

We claim:

1. A polyurethane obtained by reaction of
    (a) 30% to 60% by weight of di- or polyisocyanate comprising on average from 1 to 10 allophanate groups and on average from 1 to 10 C—C double bonds per molecule, and
    (b) 1% to 20% by weight of further di- or polyisocyanate, with
    (c) 30% to 50% by weight of compounds having at least one isocyanate-reactive group, comprising at least one dihydroxy functional aliphatic polycarbonate diol (c1) with a molecular weight from 500 to 3000 g/mol,
    weight percentages being based on a total of the polyurethane of 100%,
    wherein:
    a weight-average molecular weight of the polyurethane ranges from 1000 to 25000 g/mol;
    an amount of the dihydroxy functional aliphatic polycarbonate diol (c1) is from 10% to 40% by weight;
    the at least one compound having at least one isocyanate-reactive group (c) further comprises at least one compound (c2) bearing at least one group reactive against isocyanate and at least one acid group selected from the group consisting of a 1,1,1-trimethylol-$C_1$-$C_4$-alkylcarboxylic acid, citric acid, a 2,2-dimethylol-$C_1$-$C_4$-alkylcarboxylic acid, and a 2,2-dimethylol-$C_1$-$C_4$-alkylsulfonic acid;
an amount of compound (c2) is from 2% to 20% by weight;
the at least one compound having at least one isocyanate-reactive group (c) further comprises at least one compound (c3) bearing exactly two hydroxy groups and no further functional groups;
an amount of compound (c3) is from 0.5% to 10% by weight; and
a proportion of the at least one compound (c3) in the total amount of compounds (c1), (c2) and (c3) is not more than 5.73% by weight.

2. The polyurethane of claim 1, wherein:
said di- or polyisocyanate (a) is prepared by reaction of at least one di- or polyisocyanate (a1) with at least one compound of the general formula (I):

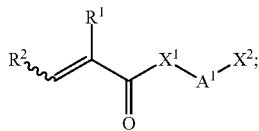

I $R^1$ and $R^2$ independently represent hydrogen or $C_1$-$C_{10}$-alkyl;
$X^1$ represents oxygen or N—$R^3$;
$A^1$ represents $C_1$-$C_{20}$-alkylene, which is unsubstituted or singly or multiply substituted by $C_1$-$C_1$-alkyl, phenyl or O—$C_1$-$C_4$-alkyl, and in which one or more nonadjacent $CH_2$ groups may be replaced by oxygen;
$X^2$ represents hydroxyl or NH—$R^3$;
$R^3$ independently represents hydrogen, $C_1$-$C_{10}$-alkyl or phenyl.

3. The polyurethane according to claim 1, wherein:
the polycarbonate diol is represented by formula (II):

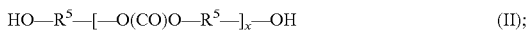

(II);

$R^5$ represents a divalent aliphatic or cycloaliphatic; and
x represents a positive integer from 2 to 20.

4. The polyurethane according to claim 1, wherein the at least one compound having at least one isocyanate-reactive group (c) further comprises at least one poly-$C_2$-$C_3$-alkylene glycol having on average from 3 to 300 $C_2$-$C_3$-alkylene oxide units per molecule.

5. The polyurethane according to claim 4, wherein acidic groups in the polyurethane are at least partially neutralized by at least one tertiary amine bearing at least one hydroxy group or an alkali metal hydroxide.

6. An aqueous dispersion, comprising:
(A) the polyurethane of claim 1;
(B) a pigment; and
(C) at least one polymerization inhibitor.

7. The aqueous dispersions according to claim 6, further comprising:
(D) at least one resin selected from the group consisting of a styrene-acrylate copolymer and a polyurethane.

8. The aqueous dispersions according to claim 6, further comprising:
(E) at least one photoinitiator (E).

9. The aqueous dispersions according to claim 6, wherein the aqueous dispersion is cured by electron radiation in the absence of a photoinitiator (E).

10. A flexographic or gravure printing ink, comprising at least one polyurethane according to claim 1.

11. A printing process, comprising applying the aqueous dispersion of claim 6 to a substrate, wherein the printing process is selected from the group consisting of ink jet printing, flexographic printing, and gravure printing.

12. A process for printing a substrate, the process comprising printing a substrate with a printing ink comprising at least one aqueous dispersion according to claim 6, wherein the printing process is selected from the group consisting of ink jet printing, flexographic printing, and gravure printing.

13. The process according to claim 12, wherein the substrate is selected from the group consisting of a paper, a paperboard, a cardboard, a polyester sheet, a polyester film, a polyethylene sheet, a polyethylene film, and a glass.

14. The process according to claim 12, wherein the printing ink printed onto the substrate is at least partially dried before it is cured in a final step.

15. The process according to claim 14, wherein, after the at least partially drying, another printing ink is printed onto the at least partially dried ink.

16. The process according to claim 12, wherein a curing of the printing ink comprising no photoinitiator occurs by electron radiation in at least one electron flash device with an energy of 50 to 300 keV.

17. The process according to claim 12, wherein a curing of the printing ink comprising at least one photoinitiator occurs by actinic radiation having a wavelength range from 200 nm to 700 nm.

18. A polyurethane obtained by reaction of
(a) 30% to 60% by weight of di- or polyisocyanate comprising on average from 1 to 10 allophanate groups and on average from 1 to 10 C—C double bonds per molecule, and
(b) 1% to 20% by weight of further di- or polyisocyanate, with
(c) 30% to 50% by weight of compounds having at least one isocyanate-reactive group, comprising at least one dihydroxy functional aliphatic polycarbonate diol (c1) with a molecular weight from 500 to 3000 g/mol,
weight percentages being based on a total of the polyurethane (A) of 100%,
wherein:
the compounds (c) having at least one isocyanate-reactive group do not include a polycarbonate diol derived from a cycloaliphatic polyol;
an amount of the dihydroxy functional aliphatic polycarbonate diol (c1) is from 10% to 40% by weight;
the at least one compound having at least one isocyanate-reactive group (c) further comprises at least one compound (c2) bearing at least one group reactive against isocyanate and at least one acid group selected from the group consisting of a 1,1,1-trimethylol-$C_1$-$C_4$-alkylcarboxylic acid, citric acid, a 2,2-dimethylol-$C_1$-$C_4$-alkylcarboxylic acid, and a 2,2-dimethylol-$C_1$-$C_4$-alkylsulfonic acid;
an amount of compound (c2) is from 2% to 20% by weight;
the at least one compound having at least one isocyanate-reactive group (c) further comprises at least one compound (c3) bearing exactly two hydroxy groups and no further functional groups;
an amount of compound (c3) is from 0.5% to 10% by weight; and a proportion of the at least one compound (c3) in the total amount of compounds (c1), (c2) and (c3) is not more than 5.73% by weight.

\* \* \* \* \*

UNITED STATES PATENT AND TRADEMARK OFFICE
CERTIFICATE OF CORRECTION

PATENT NO. : 10,683,426 B2
APPLICATION NO. : 14/440440
DATED : June 16, 2020
INVENTOR(S) : Sebastian Berger et al.

It is certified that error appears in the above-identified patent and that said Letters Patent is hereby corrected as shown below:

In the Specification

In Column 2, Line 30, delete "uretoneimine," and insert -- uretonimine, --, therefor.

In Column 2, Line 30, delete "uretidione," and insert -- uretdione, --, therefor.

In Column 3, Line 39, delete "spinell" and insert -- spinel --, therefor.

In Column 3, Line 50, delete "spinell" and insert -- spinel --, therefor.

In Column 3, Line 65, delete "P Naphthol" and insert -- Naphthol --, therefor.

In Column 3, Line 66, delete "diary)" and insert -- diaryl --, therefor.

In Column 4, Line 3, delete "laked" and insert -- leaked --, therefor.

In Column 5, Line 12, delete "($C_2H_6$)" and insert -- ($C_2H_5$) --, therefor.

In Column 5, Line 13, delete "(iSo-" and insert -- (iso- --, therefor.

In Column 5, Line 34, delete "allophanat" and insert -- allophanate --, therefor.

In Column 6, Line 66, delete "$(C_nH_{2n-2})^-$" and insert -- $(C_nH_{2n-1}O_2)^-$ --, therefor.

In Column 7, Lines 13-14, delete "tetramethylethylene-diamine," and insert -- tetramethylethylenediamine, --, therefor.

In Column 7, Line 27, delete "dipiparazine" and insert -- dipiperazine --, therefor.

In Column 7, Line 27, delete "dimethylpiparazine," and insert -- dimethylpiperazine, --, therefor.

Signed and Sealed this
Twenty-ninth Day of September, 2020

Andrei Iancu
*Director of the United States Patent and Trademark Office*

CERTIFICATE OF CORRECTION (continued)
U.S. Pat. No. 10,683,426 B2

In Column 8, Line 64, delete "(1a)," and insert -- (a1), --, therefor.

In Column 9, Line 27, delete "HO---R$^5$-[O(CO)O---R$^5$-]x---OH" and insert -- HO-R$^5$-[-O(CO)O-R$^5$-]$_x$-OH --, therefor.

In Column 9, Line 38, delete "(c1 b)" and insert -- (c1b) --, therefor.

In Column 10, Line 19, delete "NON." and insert -- NO$_x$. --, therefor.

In Column 10, Line 48, delete "(c1 b)" and insert -- (c1b) --, therefor.

In Column 11, Line 23, delete "aceticacid," and insert -- acetic acid, --, therefor.

In Column 12, Line 7, delete "isocyante," and insert -- isocyanate, --, therefor.

In Column 16, Lines 20-21, delete "free radicals" and insert -- free-radicals --, therefor.

In Column 17, Line 20, delete "Free Radical" and insert -- Free-Radical --, therefor.

In Column 17, Line 39, delete "2-acetyl phenanthrene," and insert -- 2-acetylphenanthrene, --, therefor.

In Column 17, Line 43, delete "propylthio-xanthone," and insert -- propylthioxanthone, --, therefor.

In Column 17, Line 63, delete "phenylglyoxalic" and insert -- phenylglyoxylic --, therefor.

In Column 19, Line 26, delete "dipiparazine" and insert -- dipiperazine --, therefor.

In Column 19, Line 27, delete "dimethylpiparazine," and insert -- dimethylpiperazine, --, therefor.

In Column 20, Line 54, delete "F.I" and insert -- F.1 --, therefor.

In Column 22, Line 59, delete "mPas.s" and insert -- mPa.s --, therefor.

In Column 23, Line 23, delete "re-dissolving" and insert -- redissloving --, therefor.

In Column 27, Line 24, delete "neopentylglycole," and insert -- neopentylglycol, --, therefor.

In Column 27, Line 25, delete "nimethylolpropionic" and insert -- dimethylolpropionic --, therefor.

In Column 27, Line 37, delete "Acetone" and insert -- acetone --, therefor.

In Column 27, Line 51, delete "neopentylglycole," and insert -- neopentylglycol, --, therefor.

In Column 28, Line 19, delete "Acetone" and insert -- acetone --, therefor.

CERTIFICATE OF CORRECTION (continued)
U.S. Pat. No. 10,683,426 B2

In Column 28, Line 22, delete "Acetone" and insert -- acetone --, therefor.

In Column 28, Line 36, delete "neopentylglycole," and insert -- neopentylglycol, --, therefor.

In Column 28, Lines 60-61, delete "neopentylglycole," and insert -- neopentylglycol, --, therefor.

In Column 29, Lines 22-23, delete "neopentylglycole," and insert -- neopentylglycol, --, therefor.

In Column 29, Line 33, delete "Acetone" and insert -- acetone --, therefor.

In Column 29, Line 36, delete "Acetone" and insert -- acetone --, therefor.

In Column 29, Lines 48-49, delete "neopentylglycole," and insert -- neopentylglycol, --, therefor.

In Column 30, Lines 9-10, delete "neopentylglycole," and insert -- neopentylglycol, --, therefor.

In Column 30, Lines 39-40, delete "neopentylglycole," and insert -- neopentylglycol, --, therefor.

In Column 31, Line 35 (approx.), delete "Heat Seal" and insert -- Heat-Seal --, therefor.

In Columns 31-32, Line 42 (approx.), delete "damage" and insert -- damage. --, therefor.

In Column 31, Line 46 (approx.), delete "dryingspeed" and insert -- drying speed --, therefor.

In Columns 31-32, Line 49 (approx.), delete "damage" and insert -- damage. --, therefor.

In the Claims

In Columns 32-33, Lines 67 and 1, Claim 1, delete "alkyl-carboxylic" and insert -- alkylcarboxylic --, therefor.

In Column 33, Line 15, Claim 2, delete "of claim" and insert -- according to claim --, therefor.

In Column 33, Line 22 (approx.), Claim 2, delete "I" and insert -- (I) --, therefor.

In Column 33, Line 32, Claim 2, delete "$C_1$-$C_1$-" and insert -- $C_1$-$C_4$- --, therefor.

In Column 34, Lines 56-57, Claim 18, delete "alkyl-carboxylic" and insert -- alkylcarboxylic --, therefor.